United States Patent
Ramachandran et al.

(10) Patent No.: US 9,906,260 B2
(45) Date of Patent: Feb. 27, 2018

(54) SENSOR-BASED CLOSED LOOP ANTENNA SWAPPING APPARATUS AND METHODS

(71) Applicant: Pulse Finland Oy, Oulunsalo (FI)

(72) Inventors: Prasadh Ramachandran, Oulu (FI); Ilkka Heikura, Kempele (FI); Petteri Annamaa, Oulunsalo (FI)

(73) Assignee: Pulse Finland Oy, Oulunsalo (FI)

( * ) Notice: Subject to any disclaimer, the term of this patent is extended or adjusted under 35 U.S.C. 154(b) by 0 days.

(21) Appl. No.: 14/814,333

(22) Filed: Jul. 30, 2015

(65) Prior Publication Data

US 2017/0033830 A1 Feb. 2, 2017

(51) Int. Cl.
 *H04B 1/44* (2006.01)
 *H04B 1/3827* (2015.01)

(52) U.S. Cl.
 CPC .............. *H04B 1/44* (2013.01); *H04B 1/3838* (2013.01)

(58) Field of Classification Search
 CPC ................................. H04B 1/44; H04B 1/3838
 USPC ................ 455/78, 83, 90.2, 41.1, 41.2, 41.3
 See application file for complete search history.

(56) References Cited

U.S. PATENT DOCUMENTS

| | | | |
|---|---|---|---|
| 2,745,102 A | 5/1956 | Norgorden | |
| 3,938,161 A | 2/1976 | Sanford | |
| 4,004,228 A | 1/1977 | Mullett | |
| 4,028,652 A | 6/1977 | Wakino et al. | |
| 4,031,468 A | 6/1977 | Ziebell et al. | |
| 4,054,874 A | 10/1977 | Oltman | |
| 4,069,483 A | 1/1978 | Kaloi | |
| 4,123,756 A | 10/1978 | Nagata et al. | |
| 4,123,758 A | 10/1978 | Shibano et al. | |

(Continued)

FOREIGN PATENT DOCUMENTS

| CN | 1316797 | 10/2007 |
|---|---|---|
| CN | 101958455 A | 1/2011 |

(Continued)

OTHER PUBLICATIONS

"An Adaptive Microstrip Patch Antenna for Use in Portable Transceivers", Rostbakken et al., Vehicular Technology Conference, 1996, Mobile Technology for the Human Race, pp. 339-343.

(Continued)

*Primary Examiner* — Md Talukder
(74) *Attorney, Agent, or Firm* — Gazdzinski & Associates, PC (57) ABSTRACT

Antenna systems that make use of an integrated proximity sensor or other sensor in order to implement a closed loop antenna selection system. In one embodiment, the antenna system is implemented within an exemplary portable wireless device and includes as its primary components for implementing the closed loop antenna selection system: a proximity sensor/microcontroller unit (MCU); a switching apparatus; a baseband front end module (FEM); and a number of antenna modules. The integrated proximity sensor/MCU detects the presence (influence) of a user's hand, or other loading by any other dielectric or metal component, through measurements that take place through the antenna modules and selects the appropriate RF path for transmission and/or reception by the mobile device. Methods of using and testing the aforementioned antenna systems are also disclosed.

20 Claims, 6 Drawing Sheets

(56) References Cited

U.S. PATENT DOCUMENTS

| | | |
|---|---|---|
| 4,131,893 A | 12/1978 | Munson et al. |
| 4,201,960 A | 5/1980 | Skutta et al. |
| 4,255,729 A | 3/1981 | Fukasawa et al. |
| 4,313,121 A | 1/1982 | Campbell et al. |
| 4,356,492 A | 10/1982 | Kaloi |
| 4,370,657 A | 1/1983 | Kaloi |
| 4,423,396 A | 12/1983 | Makimoto et al. |
| 4,431,977 A | 2/1984 | Sokola et al. |
| 4,546,357 A | 10/1985 | Laughon et al. |
| 4,559,508 A | 12/1985 | Nishikawa et al. |
| 4,625,212 A | 11/1986 | Oda et al. |
| 4,653,889 A | 3/1987 | Bizouard et al. |
| 4,661,992 A | 4/1987 | Garay et al. |
| 4,692,726 A | 9/1987 | Green et al. |
| 4,703,291 A | 10/1987 | Nishikawa et al. |
| 4,706,050 A | 11/1987 | Andrews |
| 4,716,391 A | 12/1987 | Moutrie et al. |
| 4,740,765 A | 4/1988 | Ishikawa et al. |
| 4,742,562 A | 5/1988 | Kommrusch |
| 4,761,624 A | 8/1988 | Igarashi et al. |
| 4,800,348 A | 1/1989 | Rosar et al. |
| 4,800,392 A | 1/1989 | Garay et al. |
| 4,821,006 A | 4/1989 | Ishikawa et al. |
| 4,823,098 A | 4/1989 | DeMuro et al. |
| 4,827,266 A | 5/1989 | Sato et al. |
| 4,829,274 A | 5/1989 | Green et al. |
| 4,835,538 A | 5/1989 | McKenna et al. |
| 4,835,541 A | 5/1989 | Johnson et al. |
| 4,862,181 A | 8/1989 | PonceDeLeon et al. |
| 4,879,533 A | 11/1989 | De Muro et al. |
| 4,896,124 A | 1/1990 | Schwent |
| 4,907,006 A | 3/1990 | Nishikawa et al. |
| 4,954,796 A | 9/1990 | Green et al. |
| 4,965,537 A | 10/1990 | Kommrusch |
| 4,977,383 A | 12/1990 | Niiranen |
| 4,980,694 A | 12/1990 | Hines |
| 5,016,020 A | 5/1991 | Simpson |
| 5,017,932 A | 5/1991 | Ushiyama et al. |
| 5,043,738 A | 8/1991 | Shapiro et al. |
| 5,047,739 A | 9/1991 | Kuokkanen |
| 5,053,786 A | 10/1991 | Silverman et al. |
| 5,057,847 A | 10/1991 | Vaeisaenen |
| 5,061,939 A | 10/1991 | Nakase |
| 5,097,236 A | 3/1992 | Wakino et al. |
| 5,103,197 A | 4/1992 | Turunen |
| 5,109,536 A | 4/1992 | Kommrusch |
| 5,155,493 A | 10/1992 | Thursby et al. |
| 5,157,363 A | 10/1992 | Puurunen |
| 5,159,303 A | 10/1992 | Flink |
| 5,166,697 A | 11/1992 | Viladevall et al. |
| 5,170,173 A | 12/1992 | Krenz et al. |
| 5,203,021 A | 4/1993 | Repplinger et al. |
| 5,210,510 A | 5/1993 | Karsikas |
| 5,210,542 A | 5/1993 | Pett et al. |
| 5,220,335 A | 6/1993 | Huang |
| 5,229,777 A | 7/1993 | Doyle |
| 5,239,279 A | 8/1993 | Turunen |
| 5,278,528 A | 1/1994 | Turunen |
| 5,281,326 A | 1/1994 | Galla |
| 5,298,873 A | 3/1994 | Ala-Kojola |
| 5,302,924 A | 4/1994 | Jantunen |
| 5,304,968 A | 4/1994 | Ohtonen |
| 5,307,036 A | 4/1994 | Turunen |
| 5,319,328 A | 6/1994 | Turunen |
| 5,349,315 A | 9/1994 | Ala-Kojola |
| 5,349,700 A | 9/1994 | Parker |
| 5,351,023 A | 9/1994 | Niiranen |
| 5,354,463 A | 10/1994 | Turunen |
| 5,355,142 A | 10/1994 | Marshall et al. |
| 5,357,262 A | 10/1994 | Blaese |
| 5,363,114 A | 11/1994 | Shoemaker |
| 5,369,782 A | 11/1994 | Kawano et al. |
| 5,382,959 A | 1/1995 | Pett et al. |
| 5,386,214 A | 1/1995 | Sugawara |
| 5,387,886 A | 2/1995 | Takalo |
| 5,394,162 A | 2/1995 | Korovesis et al. |
| RE34,898 E | 4/1995 | Turunen |
| 5,408,206 A | 4/1995 | Turunen |
| 5,418,508 A | 5/1995 | Puurunen |
| 5,432,489 A | 7/1995 | Yrjola |
| 5,438,697 A | 8/1995 | Fowler et al. |
| 5,440,315 A | 8/1995 | Wright et al. |
| 5,442,280 A | 8/1995 | Baudart |
| 5,442,366 A | 8/1995 | Sanford |
| 5,444,453 A | 8/1995 | Lalezari |
| 5,467,065 A | 11/1995 | Turunen |
| 5,473,295 A | 12/1995 | Turunen |
| 5,506,554 A | 4/1996 | Ala-Kojola |
| 5,508,668 A | 4/1996 | Prokkola |
| 5,510,802 A | 4/1996 | Tsuru et al. |
| 5,517,683 A | 5/1996 | Collett et al. |
| 5,521,561 A | 5/1996 | Yrjola |
| 5,526,003 A | 6/1996 | Ogawa et al. |
| 5,532,703 A | 7/1996 | Stephens et al. |
| 5,541,560 A | 7/1996 | Turunen |
| 5,541,617 A | 7/1996 | Connolly et al. |
| 5,543,764 A | 8/1996 | Turunen |
| 5,550,519 A | 8/1996 | Korpela |
| 5,557,287 A | 9/1996 | Pottala et al. |
| 5,557,292 A | 9/1996 | Nygren et al. |
| 5,566,441 A | 10/1996 | Marsh et al. |
| 5,570,071 A | 10/1996 | Ervasti |
| 5,585,771 A | 12/1996 | Ervasti |
| 5,585,810 A | 12/1996 | Tsuru et al. |
| 5,589,844 A | 12/1996 | Belcher et al. |
| 5,594,395 A | 1/1997 | Niiranen |
| 5,604,471 A | 2/1997 | Rattila |
| 5,627,502 A | 5/1997 | Ervasti |
| 5,649,316 A | 7/1997 | Prudhomme et al. |
| 5,668,561 A | 9/1997 | Perrotta et al. |
| 5,675,301 A | 10/1997 | Nappa |
| 5,689,221 A | 11/1997 | Niiranen |
| 5,694,135 A | 12/1997 | Dikun et al. |
| 5,696,517 A | 12/1997 | Kawahata et al. |
| 5,703,600 A | 12/1997 | Burrell et al. |
| 5,709,823 A | 1/1998 | Hayes et al. |
| 5,711,014 A | 1/1998 | Crowley et al. |
| 5,717,368 A | 2/1998 | Niiranen |
| 5,731,749 A | 3/1998 | Yrjola |
| 5,734,305 A | 3/1998 | Ervasti |
| 5,734,350 A | 3/1998 | Deming et al. |
| 5,734,351 A | 3/1998 | Ojantakanen |
| 5,736,965 A | 4/1998 | Mosebrook et al. |
| 5,739,735 A | 4/1998 | Pyykko |
| 5,742,259 A | 4/1998 | Annamaa |
| 5,757,327 A | 5/1998 | Yajima et al. |
| 5,760,746 A | 6/1998 | Kawahata |
| 5,764,190 A | 6/1998 | Murch et al. |
| 5,767,809 A | 6/1998 | Chuang et al. |
| 5,768,217 A | 6/1998 | Sonoda et al. |
| 5,777,581 A | 7/1998 | Lilly et al. |
| 5,777,585 A | 7/1998 | Tsuda et al. |
| 5,793,269 A | 8/1998 | Ervasti |
| 5,797,084 A | 8/1998 | Tsuru et al. |
| 5,812,094 A | 9/1998 | Maldonado |
| 5,815,048 A | 9/1998 | Ala-Kojola |
| 5,822,705 A | 10/1998 | Lehtola |
| 5,852,421 A | 12/1998 | Maldonado |
| 5,861,854 A | 1/1999 | Kawahata et al. |
| 5,874,926 A | 2/1999 | Tsuru et al. |
| 5,880,697 A | 3/1999 | McCarrick et al. |
| 5,886,668 A | 3/1999 | Pedersen et al. |
| 5,892,490 A | 4/1999 | Asakura et al. |
| 5,903,820 A | 5/1999 | Hagstrom |
| 5,905,475 A | 5/1999 | Annamaa |
| 5,920,290 A | 7/1999 | McDonough et al. |
| 5,926,139 A | 7/1999 | Korisch |
| 5,929,813 A | 7/1999 | Eggleston |
| 5,936,583 A | 8/1999 | Tadahiko et al. |
| 5,943,016 A | 8/1999 | Snyder, Jr. et al. |
| 5,952,975 A | 9/1999 | Pedersen et al. |
| 5,959,583 A | 9/1999 | Funk |
| 5,963,180 A | 10/1999 | Leisten |
| 5,966,097 A | 10/1999 | Fukasawa et al. |

(56) References Cited

U.S. PATENT DOCUMENTS

| | | |
|---|---|---|
| 5,970,393 A | 10/1999 | Khorrami et al. |
| 5,977,710 A | 11/1999 | Kuramoto et al. |
| 5,986,606 A | 11/1999 | Kossiavas et al. |
| 5,986,608 A | 11/1999 | Korisch et al. |
| 5,990,848 A | 11/1999 | Annamaa |
| 5,999,132 A | 12/1999 | Kitchener et al. |
| 6,005,529 A | 12/1999 | Hutchinson |
| 6,006,419 A | 12/1999 | Vandendolder et al. |
| 6,008,764 A | 12/1999 | Ollikainen |
| 6,009,311 A | 12/1999 | Killion et al. |
| 6,014,106 A | 1/2000 | Annamaa |
| 6,016,130 A | 1/2000 | Annamaa |
| 6,023,608 A | 2/2000 | Yrjola |
| 6,031,496 A | 2/2000 | Kuittinen et al. |
| 6,034,637 A | 3/2000 | McCoy et al. |
| 6,037,848 A | 3/2000 | Alila |
| 6,043,780 A | 3/2000 | Funk et al. |
| 6,052,096 A | 4/2000 | Tsuru et al. |
| 6,072,434 A | 6/2000 | Papatheodorou |
| 6,078,231 A | 6/2000 | Pelkonen |
| 6,091,363 A | 7/2000 | Komatsu et al. |
| 6,091,365 A | 7/2000 | Anders et al. |
| 6,097,345 A | 8/2000 | Walton |
| 6,100,849 A | 8/2000 | Tsubaki et al. |
| 6,112,108 A | 8/2000 | Tepper et al. |
| 6,121,931 A | 9/2000 | Levi et al. |
| 6,133,879 A | 10/2000 | Grangeat et al. |
| 6,134,421 A | 10/2000 | Lee et al. |
| 6,140,966 A | 10/2000 | Pankinaho |
| 6,140,973 A | 10/2000 | Annamaa |
| 6,147,650 A | 11/2000 | Kawahata et al. |
| 6,157,819 A | 12/2000 | Vuokko |
| 6,177,908 B1 | 1/2001 | Kawahata |
| 6,185,434 B1 | 2/2001 | Hagstrom |
| 6,190,942 B1 | 2/2001 | Wilm et al. |
| 6,195,049 B1 | 2/2001 | Kim et al. |
| 6,204,826 B1 | 3/2001 | Rutkowski et al. |
| 6,215,376 B1 | 4/2001 | Hagstrom |
| 6,218,989 B1 | 4/2001 | Schneider et al. |
| 6,246,368 B1 | 6/2001 | Deming et al. |
| 6,252,552 B1 | 6/2001 | Tarvas et al. |
| 6,252,554 B1 | 6/2001 | Isohatala |
| 6,255,994 B1 | 7/2001 | Saito |
| 6,268,831 B1 | 7/2001 | Sanford |
| 6,281,848 B1 | 8/2001 | Nagumo et al. |
| 6,259,029 B1 | 9/2001 | Chen et al. |
| 6,297,776 B1 | 10/2001 | Pankinaho |
| 6,304,220 B1 | 10/2001 | Herve et al. |
| 6,308,720 B1 | 10/2001 | Modi |
| 6,316,975 B1 | 11/2001 | O'Toole et al. |
| 6,323,811 B1 | 11/2001 | Tsubaki |
| 6,326,921 B1 | 12/2001 | Egorov et al. |
| 6,337,663 B1 | 1/2002 | Chi-Minh |
| 6,340,954 B1 | 1/2002 | Annamaa et al. |
| 6,342,859 B1 | 1/2002 | Kurz et al. |
| 6,343,208 B1 | 1/2002 | Ying |
| 6,346,914 B1 | 2/2002 | Annamaa |
| 6,348,892 B1 | 2/2002 | Annamaa |
| 6,353,443 B1 | 2/2002 | Ying |
| 6,366,243 B1 | 4/2002 | Isohatala |
| 6,377,827 B1 | 4/2002 | Rydbeck |
| 6,380,905 B1 | 4/2002 | Annarnaa |
| 6,396,444 B1 | 5/2002 | Goward |
| 6,404,394 B1 | 6/2002 | Hill |
| 6,417,813 B1 | 7/2002 | Durham et al. |
| 6,421,014 B1 | 7/2002 | Sanad |
| 6,423,915 B1 | 7/2002 | Winter |
| 6,429,818 B1 | 8/2002 | Johnson et al. |
| 6,452,551 B1 | 9/2002 | Chen |
| 6,452,558 B1 | 9/2002 | Saitou et al. |
| 6,456,249 B1 | 9/2002 | Johnson et al. |
| 6,459,413 B1 | 10/2002 | Tsang et al. |
| 6,462,716 B1 | 10/2002 | Kushihi |
| 6,469,673 B2 | 10/2002 | Kaiponen |
| 6,473,056 B2 | 10/2002 | Annamaa |
| 6,476,767 B2 | 11/2002 | Aoyama et al. |
| 6,476,769 B1 | 11/2002 | Lehtola |
| 6,480,155 B1 | 11/2002 | Eggleston |
| 6,483,462 B2 | 11/2002 | Weinberger |
| 6,498,586 B2 | 12/2002 | Pankinaho |
| 6,501,425 B1 | 12/2002 | Nagumo |
| 6,515,625 B1 | 2/2003 | Johnson |
| 6,518,925 B1 | 2/2003 | Annamaa |
| 6,529,168 B2 | 3/2003 | Mikkola |
| 6,529,749 B1 | 3/2003 | Hayes et al. |
| 6,535,170 B2 | 3/2003 | Sawamura et al. |
| 6,538,604 B1 | 3/2003 | Isohatala |
| 6,538,607 B2 | 3/2003 | Barna |
| 6,542,050 B1 | 4/2003 | Arai et al. |
| 6,549,167 B1 | 4/2003 | Yoon |
| 6,552,686 B2 | 4/2003 | Ollikainen et al. |
| 6,556,812 B1 | 4/2003 | Pennanen et al. |
| 6,566,944 B1 | 5/2003 | Pehlke |
| 6,580,396 B2 | 6/2003 | Lin |
| 6,580,397 B2 | 6/2003 | Kuriyama et al. |
| 6,600,449 B2 | 7/2003 | Onaka |
| 6,603,430 B1 | 8/2003 | Hill et al. |
| 6,606,016 B2 | 8/2003 | Takamine et al. |
| 6,611,235 B2 | 8/2003 | Barna et al. |
| 6,614,400 B2 | 9/2003 | Egorov |
| 6,614,401 B2 | 9/2003 | Onaka et al. |
| 6,614,405 B1 | 9/2003 | Mikkoken |
| 6,634,564 B2 | 10/2003 | Kuramochi |
| 6,636,181 B2 | 10/2003 | Asano |
| 6,639,564 B2 | 10/2003 | Johnson |
| 6,646,606 B2 | 11/2003 | Mikkola |
| 6,650,295 B2 | 11/2003 | Ollikainen et al. |
| 6,657,593 B2 | 12/2003 | Nagumo et al. |
| 6,657,595 B1 | 12/2003 | Phillips et al. |
| 6,670,926 B2 | 12/2003 | Miyasaka |
| 6,677,903 B2 | 1/2004 | Wang |
| 6,680,705 B2 | 1/2004 | Tan et al. |
| 6,683,573 B2 | 1/2004 | Park |
| 6,693,594 B2 | 2/2004 | Pankinaho et al. |
| 6,717,551 B1 | 4/2004 | Desclos et al. |
| 6,727,857 B2 | 4/2004 | Mikkola |
| 6,734,825 B1 | 5/2004 | Guo et al. |
| 6,734,826 B1 | 5/2004 | Dai et al. |
| 6,738,022 B2 | 5/2004 | Varjakka |
| 6,741,214 B1 | 5/2004 | Kadambi et al. |
| 6,753,813 B2 | 6/2004 | Kushihi |
| 6,759,989 B2 | 7/2004 | Tarvas et al. |
| 6,765,536 B2 | 7/2004 | Phillips et al. |
| 6,774,853 B2 | 8/2004 | Wong et al. |
| 6,781,545 B2 | 8/2004 | Sung |
| 6,801,166 B2 | 10/2004 | Mikkola |
| 6,801,169 B1 | 10/2004 | Chang et al. |
| 6,806,835 B2 | 10/2004 | Iwai |
| 6,819,287 B2 | 11/2004 | Sullivan et al. |
| 6,819,293 B2 | 11/2004 | Antonius Johannes et al. |
| 6,825,818 B2 | 11/2004 | Toncich |
| 6,836,249 B2 | 12/2004 | Kenoun et al. |
| 6,847,329 B2 | 1/2005 | Ikegaya et al. |
| 6,856,293 B2 | 2/2005 | Bordi |
| 6,862,437 B1 | 3/2005 | McNamara |
| 6,862,441 B2 | 3/2005 | Ella |
| 6,873,291 B2 | 3/2005 | Aoyama |
| 6,876,329 B2 | 4/2005 | Milosavljevic |
| 6,882,317 B2 | 4/2005 | Koskiniemi |
| 6,891,507 B2 | 5/2005 | Kushihi et al. |
| 6,897,810 B2 | 5/2005 | Dai et al. |
| 6,900,768 B2 | 5/2005 | Iguchi et al. |
| 6,903,692 B2 | 6/2005 | Kivekas |
| 6,911,945 B2 | 6/2005 | Korva |
| 6,922,171 B2 | 7/2005 | Annamaa |
| 6,925,689 B2 | 8/2005 | Folkmar |
| 6,927,729 B2 | 8/2005 | Legay |
| 6,937,196 B2 | 8/2005 | Korva |
| 6,950,065 B2 | 9/2005 | Ying et al. |
| 6,950,066 B2 | 9/2005 | Hendler et al. |
| 6,950,068 B2 | 9/2005 | Bordi |
| 6,950,072 B2 | 9/2005 | Miyata et al. |
| 6,952,144 B2 | 10/2005 | Javor |
| 6,952,187 B2 | 10/2005 | Annamaa |

(56) References Cited

U.S. PATENT DOCUMENTS

| | | |
|---|---|---|
| 6,958,730 B2 | 10/2005 | Nagumo et al. |
| 6,961,544 B1 | 11/2005 | Hagstrom |
| 6,963,308 B2 | 11/2005 | Korva |
| 6,963,310 B2 | 11/2005 | Horita et al. |
| 6,967,618 B2 | 11/2005 | Ojantakanen |
| 6,975,278 B2 | 12/2005 | Song et al. |
| 6,980,158 B2 | 12/2005 | Iguchi et al. |
| 6,985,108 B2 | 1/2006 | Mikkota |
| 6,992,543 B2 | 1/2006 | Luetzelschwab et al. |
| 6,995,710 B2 | 2/2006 | Sugimoto et al. |
| 7,023,341 B2 | 4/2006 | Stilp |
| 7,031,744 B2 | 4/2006 | Kojima et al. |
| 7,034,752 B2 | 4/2006 | Sekiguchi et al. |
| 7,042,403 B2 | 5/2006 | Colburn et al. |
| 7,053,841 B2 | 5/2006 | Ponce De Leon et al. |
| 7,054,671 B2 | 5/2006 | Kaiponen et al. |
| 7,057,560 B2 | 6/2006 | Erkocevic |
| 7,061,430 B2 | 6/2006 | Zheng et al. |
| 7,081,857 B2 | 7/2006 | Kinnunen et al. |
| 7,084,831 B2 | 8/2006 | Takagi et al. |
| 7,099,690 B2 | 8/2006 | Milosavljevic |
| 7,113,133 B2 | 9/2006 | Chen et al. |
| 7,119,749 B2 | 10/2006 | Miyata et al. |
| 7,126,546 B2 | 10/2006 | Annamaa |
| 7,129,893 B2 | 10/2006 | Otaka et al. |
| 7,136,019 B2 | 11/2006 | Mikkola |
| 7,136,020 B2 | 11/2006 | Yamaki |
| 7,142,824 B2 | 11/2006 | Kojima et al. |
| 7,148,847 B2 | 12/2006 | Yuanzhu |
| 7,148,849 B2 | 12/2006 | Lin |
| 7,148,851 B2 | 12/2006 | Takaki et al. |
| 7,170,464 B2 | 1/2007 | Tang et al. |
| 7,176,838 B1 | 2/2007 | Kinezos |
| 7,180,455 B2 | 2/2007 | Oh et al. |
| 7,193,574 B2 | 3/2007 | Chiang et al. |
| 7,205,942 B2 | 4/2007 | Wang et al. |
| 7,215,283 B2 | 5/2007 | Boyle |
| 7,218,280 B2 | 5/2007 | Annamaa |
| 7,218,282 B2 | 5/2007 | Humpfer et al. |
| 7,224,313 B2 | 5/2007 | McKinzie, III et al. |
| 7,230,574 B2 | 6/2007 | Johnson |
| 7,233,775 B2 | 6/2007 | De Graauw |
| 7,237,318 B2 | 7/2007 | Annamaa |
| 7,256,743 B2 | 8/2007 | Korva |
| 7,274,334 B2 | 9/2007 | O'Riordan et al. |
| 7,283,097 B2 | 10/2007 | Wen et al. |
| 7,289,064 B2 | 10/2007 | Cheng |
| 7,292,200 B2 | 11/2007 | Posluszny et al. |
| 7,319,432 B2 | 1/2008 | Andersson |
| 7,330,153 B2 | 2/2008 | Rentz |
| 7,333,067 B2 | 2/2008 | Hung et al. |
| 7,339,528 B2 | 3/2008 | Wang et al. |
| 7,340,286 B2 | 3/2008 | Kempele |
| 7,345,634 B2 | 3/2008 | Ozkar et al. |
| 7,352,326 B2 | 4/2008 | Korva |
| 7,355,270 B2 | 4/2008 | Hasebe et al. |
| 7,358,902 B2 | 4/2008 | Erkocevic |
| 7,375,695 B2 | 5/2008 | Ishizuka et al. |
| 7,381,774 B2 | 6/2008 | Bish et al. |
| 7,382,319 B2 | 6/2008 | Kaunari |
| 7,385,556 B2 | 6/2008 | Chung et al. |
| 7,388,543 B2 | 6/2008 | Vance |
| 7,391,378 B2 | 6/2008 | Mikkola |
| 7,405,702 B2 | 7/2008 | Annamaa et al. |
| 7,417,588 B2 | 8/2008 | Castany et al. |
| 7,418,990 B2 | 9/2008 | Park |
| 7,423,592 B2 | 9/2008 | Pros et al. |
| 7,432,860 B2 | 10/2008 | Huynh |
| 7,439,929 B2 | 10/2008 | Ozkar |
| 7,443,344 B2 | 10/2008 | Boyle |
| 7,468,700 B2 | 12/2008 | Milosavljevic |
| 7,468,709 B2 | 12/2008 | Niemi |
| 7,501,983 B2 | 3/2009 | Mikkola |
| 7,502,598 B2 | 3/2009 | Kronberger |
| 7,564,413 B2 | 7/2009 | Kim et al. |
| 7,589,678 B2 | 9/2009 | Nissinen et al. |
| 7,616,158 B2 | 11/2009 | Mark et al. |
| 7,633,449 B2 | 12/2009 | Oh |
| 7,663,551 B2 | 2/2010 | Nissinen |
| 7,679,565 B2 | 3/2010 | Sorvala |
| 7,692,543 B2 | 4/2010 | Copeland |
| 7,710,325 B2 | 5/2010 | Cheng |
| 7,724,204 B2 | 5/2010 | Annamaa |
| 7,760,146 B2 | 7/2010 | Ollikainen |
| 7,764,245 B2 | 7/2010 | Loyet |
| 7,786,938 B2 | 8/2010 | Sorvala |
| 7,800,544 B2 | 9/2010 | Thornell-Pers |
| 7,830,327 B2 | 11/2010 | He |
| 7,843,397 B2 | 11/2010 | Boyle |
| 7,889,139 B2 | 2/2011 | Hobson et al. |
| 7,889,143 B2 | 2/2011 | Milosavljevic |
| 7,901,617 B2 | 3/2011 | Taylor |
| 7,903,035 B2 | 3/2011 | Mikkola et al. |
| 7,916,086 B2 | 3/2011 | Koskiniemi et al. |
| 7,963,347 B2 | 6/2011 | Pabon |
| 7,973,720 B2 | 7/2011 | Sorvala |
| 8,049,670 B2 | 11/2011 | Jung et al. |
| 8,054,232 B2 | 11/2011 | Chiang et al. |
| 8,077,032 B1 | 12/2011 | Vier et al. |
| 8,098,202 B2 | 1/2012 | Annamaa et al. |
| 8,179,322 B2 | 5/2012 | Nissinen |
| 8,193,998 B2 | 6/2012 | Puente et al. |
| 8,378,892 B2 | 2/2013 | Sorvala |
| 8,466,756 B2 | 6/2013 | Milosavljevic et al. |
| 8,473,017 B2 | 6/2013 | Milosavljevic et al. |
| 8,564,485 B2 | 10/2013 | Milosavljevic et al. |
| 8,629,813 B2 | 1/2014 | Milosavljevic |
| 9,203,154 B2 | 12/2015 | Korva |
| 2001/0050636 A1 | 12/2001 | Weinberger |
| 2002/0183013 A1 | 12/2002 | Auckland et al. |
| 2002/0196192 A1 | 12/2002 | Nagumo et al. |
| 2003/0146873 A1 | 8/2003 | Blancho |
| 2004/0090378 A1 | 5/2004 | Dai et al. |
| 2004/0137950 A1 | 7/2004 | Bolin et al. |
| 2004/0145525 A1 | 7/2004 | Annabi et al. |
| 2004/0171403 A1 | 9/2004 | Mikkola |
| 2005/0055164 A1 | 3/2005 | Neff et al. |
| 2005/0057401 A1 | 3/2005 | Yuanzhu |
| 2005/0159131 A1 | 7/2005 | Shibagaki et al. |
| 2005/0176481 A1 | 8/2005 | Jeong |
| 2006/0071857 A1 | 4/2006 | Pelzer |
| 2006/0192723 A1 | 8/2006 | Harada |
| 2007/0042615 A1 | 2/2007 | Liao |
| 2007/0082789 A1 | 4/2007 | Nissila |
| 2007/0152881 A1 | 7/2007 | Chan |
| 2007/0188388 A1 | 8/2007 | Feng |
| 2008/0059106 A1 | 3/2008 | Wight |
| 2008/0088511 A1 | 4/2008 | Sorvala |
| 2008/0096492 A1* | 4/2008 | Yoon ............... H04B 1/44 455/83 |
| 2008/0174494 A1 | 7/2008 | Suzuki et al. |
| 2008/0266199 A1 | 10/2008 | Milosavljevic |
| 2009/0009415 A1 | 1/2009 | Tanska |
| 2009/0135066 A1 | 5/2009 | Raappana et al. |
| 2009/0153412 A1 | 6/2009 | Chiang et al. |
| 2009/0174604 A1 | 7/2009 | Keskitalo |
| 2009/0196160 A1 | 8/2009 | Crombach |
| 2009/0197654 A1 | 8/2009 | Teshima |
| 2009/0231213 A1 | 9/2009 | Ishimiya |
| 2010/0220058 A1 | 9/2010 | Nissinen |
| 2010/0244978 A1 | 9/2010 | Milosavljevic |
| 2010/0309092 A1 | 12/2010 | Lambacka |
| 2011/0045786 A1* | 2/2011 | Leinonen ............ H01Q 3/24 455/78 |
| 2011/0133994 A1 | 6/2011 | Korva |
| 2011/0279232 A1 | 11/2011 | Tuttle |
| 2012/0032876 A1* | 2/2012 | Tabe ............... H04B 1/3838 345/156 |
| 2012/0052820 A1* | 3/2012 | Lin ............... H04B 1/3838 455/90.2 |
| 2012/0057388 A1 | 3/2012 | Garrity |
| 2012/0062424 A1* | 3/2012 | Hwang ............ H04B 1/3838 342/374 |

(56) References Cited

U.S. PATENT DOCUMENTS

| | | | |
|---|---|---|---|
| 2012/0093046 A1* | 4/2012 | Tikka | H01Q 1/521 370/297 |
| 2012/0098588 A1 | 4/2012 | Ujvari | |
| 2012/0119955 A1 | 5/2012 | Milosavljevic et al. | |
| 2012/0329407 A1* | 12/2012 | Rousu | H01Q 3/2605 455/90.2 |
| 2013/0109370 A1* | 5/2013 | Rowson | H04W 8/22 455/418 |
| 2013/0127670 A1* | 5/2013 | Desclos | H01Q 25/04 343/700 MS |
| 2013/0137487 A1* | 5/2013 | Sato | H04M 1/72522 455/566 |
| 2013/0241780 A1* | 9/2013 | Amm | H01Q 1/243 343/702 |
| 2014/0071008 A1 | 3/2014 | Desclos et al. | |
| 2014/0087673 A1* | 3/2014 | Mostov | H03F 1/0227 455/78 |
| 2014/0106684 A1* | 4/2014 | Burns | H01Q 1/243 455/78 |
| 2014/0162574 A1* | 6/2014 | Rousu | H04W 52/04 455/78 |
| 2014/0192845 A1* | 7/2014 | Szini | H04B 7/0413 375/219 |
| 2014/0307354 A1 | 10/2014 | Watanabe | |
| 2014/0333494 A1 | 11/2014 | Huang et al. | |
| 2014/0362038 A1 | 12/2014 | Murakami et al. | |
| 2015/0022403 A1 | 1/2015 | Lin | |
| 2015/0091762 A1 | 4/2015 | Hsiao | |
| 2015/0200447 A1 | 7/2015 | Tang et al. | |
| 2016/0173172 A1* | 6/2016 | Greene | H04B 7/0404 455/562.1 |

FOREIGN PATENT DOCUMENTS

| | | |
|---|---|---|
| DE | 10104862 | 8/2002 |
| DE | 10150149 | 4/2003 |
| EP | 0 208 424 | 1/1987 |
| EP | 0 376 643 | 4/1990 |
| EP | 0 751 043 | 4/1997 |
| EP | 0 807 988 | 11/1997 |
| EP | 0 831 547 | 3/1998 |
| EP | 0 851 530 | 7/1998 |
| EP | 1 294 048 | 1/1999 |
| EP | 1 014 487 | 6/2000 |
| EP | 1 024 553 | 8/2000 |
| EP | 1 067 627 | 1/2001 |
| EP | 0 923 158 | 9/2002 |
| EP | 1 329 980 | 7/2003 |
| EP | 1 361 623 | 11/2003 |
| EP | 1 406 345 | 4/2004 |
| EP | 1 453 137 | 9/2004 |
| EP | 1 220 456 | 10/2004 |
| EP | 1 467 456 | 10/2004 |
| EP | 1 753 079 | 2/2007 |
| FI | 20020829 | 11/2003 |
| FI | 1118782 | 3/2008 |
| FR | 2553584 | 10/1983 |
| FR | 2724274 | 3/1996 |
| FR | 2873247 | 1/2006 |
| GB | 2266997 | 11/1993 |
| GB | 2360422 | 9/2001 |
| GB | 2389246 | 12/2003 |
| JP | 59-202831 | 11/1984 |
| JP | 60-206304 | 10/1985 |
| JP | 61-245704 | 11/1986 |
| JP | 06-152463 | 5/1994 |
| JP | 07-131234 | 5/1995 |
| JP | 07-221536 | 8/1995 |
| JP | 07-249923 | 9/1995 |
| JP | 07-307612 | 11/1995 |
| JP | 08-216571 | 8/1996 |
| JP | 09-083242 | 3/1997 |
| JP | 09-260934 | 10/1997 |
| JP | 09-307344 | 11/1997 |
| JP | 10-028013 | 1/1998 |
| JP | 10-107671 | 4/1998 |
| JP | 10-173423 | 6/1998 |
| JP | 10-209733 | 8/1998 |
| JP | 10-224142 | 8/1998 |
| JP | 10-322124 | 12/1998 |
| JP | 10-327011 | 12/1998 |
| JP | 11-004113 | 1/1999 |
| JP | 11-004117 | 1/1999 |
| JP | 11-068456 | 3/1999 |
| JP | 11-127010 | 5/1999 |
| JP | 11-127014 | 5/1999 |
| JP | 11-136025 | 5/1999 |
| JP | 11-355033 | 12/1999 |
| JP | 2000-278028 | 10/2000 |
| JP | 2001-053543 | 2/2001 |
| JP | 2001-267833 | 9/2001 |
| JP | 2001-217631 | 10/2001 |
| JP | 2001-326513 | 11/2001 |
| JP | 2002-319811 | 10/2002 |
| JP | 2002-329541 | 11/2002 |
| JP | 2002-335117 | 11/2002 |
| JP | 2003-060417 | 2/2003 |
| JP | 2003-124730 | 4/2003 |
| JP | 2003-179426 | 6/2003 |
| JP | 2004-112028 | 4/2004 |
| JP | 2004-363859 | 12/2004 |
| JP | 2005-005985 | 1/2005 |
| JP | 2005-252661 | 9/2005 |
| KR | 20010080521 | 10/2001 |
| KR | 20020096016 | 12/2002 |
| KR | 20130133853 A | 12/2013 |
| SE | 511900 | 12/1999 |
| TW | M460421 U | 8/2013 |
| TW | M484801 U | 8/2014 |
| WO | WO 1992/000635 | 1/1992 |
| WO | WO 1996/027219 | 9/1996 |
| WO | WO 1998/001919 | 1/1998 |
| WO | WO 1999/030479 | 6/1999 |
| WO | WO 2001/020718 | 3/2001 |
| WO | WO 2001/029927 | 4/2001 |
| WO | WO 2001/033665 | 5/2001 |
| WO | WO 2001/061781 | 8/2001 |
| WO | WO 2004/017462 | 2/2004 |
| WO | WO 2004/057697 | 7/2004 |
| WO | WO 2004/100313 | 11/2004 |
| WO | WO 2004/112189 | 12/2004 |
| WO | WO 2005/062416 | 7/2005 |
| WO | WO 2007/012697 | 2/2007 |
| WO | WO 2010/122220 | 10/2010 |

OTHER PUBLICATIONS

"Dual Band Antenna for Hand Held Portable Telephones", Liu et al., Electronics Letters, vol. 32, No. 7, 1996, pp. 609-610.

"Improved Bandwidth of Microstrip Antennas using Parasitic Elements," IEE Proc. vol. 127, Pt. H. No. 4, Aug. 1980.

"A 13.56MHz RFID Device and Software for Mobile Systems", by H. Ryoson, et al., Micro Systems Network Co., 2004 IEEE, pp. 241-244.

"A Novel Approach of a Planar Multi-Band Hybrid Series Feed Network for Use in Antenna Systems Operating at Millimeter Wave Frequencies," by M.W. Elsallal and B.L. Hauck, Rockwell Collins, Inc., 2003 pp. 15-24, waelsall@rockwellcollins.com and blhauck@rockwellcollins.com.

Abedin, M. F. and M. Ali, "Modifying the ground plane and its effect on planar inverted-F antennas (PIFAs) for mobile handsets," *IEEE Antennas and Wireless Propagation Letters*, vol. 2, 226-229, 2003.

C. R. Rowell and R. D. Murch, "A compact PIFA suitable for dual frequency 900/1800-MHz operation," *IEEE Trans. Antennas Propag.*, vol. 46, No. 4, pp. 596-598, Apr. 1998.

Cheng-Nan Hu, Willey Chen, and Book Tai, "A Compact Multi-Band Antenna Design for Mobile Handsets", *APMC 2005 Proceedings*.

Endo, T., Y. Sunahara, S. Satoh and T. Katagi, "Resonant Frequency and Radiation Efficiency of Meander Line Antennas," Electronics and Commu-nications in Japan, Part 2, vol. 83, No. 1, 52-58, 2000.

(56) References Cited

OTHER PUBLICATIONS

European Office Action, dated May 30, 2005 issued during prosecution of EP 04 396 001.2-1248.
Examination Report dated May 3, 2006 issued by the EPO for European Patent Application No. 04 396 079.8.
F.R. Hsiao, et al. "A dual-band planar inverted-F patch antenna with a branch-line slit," *Microwave Opt. Technol. Lett.*, vol. 32, Feb. 20, 2002.
Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.
Guo, Y. X. and H. S. Tan, "New compact six-band internal antenna," *IEEE Antennas and Wireless Propagation Letters*, vol. 3, 295-297, 2004.
Guo, Y. X. and Y.W. Chia and Z. N. Chen, "Miniature built-in quadband antennas for mobile handsets", *IEEE Antennas Wireless Propag. Lett.*, vol. 2, pp. 30-32, 2004.
Hoon Park, et al. "Design of an Internal antenna with wide and multiband characteristics for a mobile handset", *IEEE Microw. & Opt. Tech. Lett.* vol. 48, No. 5, May 2006.
Hoon Park, et al. "Design of Planar Inverted-F Antenna With Very Wide Impedance Bandwidth", *IEEE Microw. & Wireless Comp., Lett.*, vol. 16, No. 3, pp. 113-115, Mar. 2006.
Hossa, R., A. Byndas, and M. E. Bialkowski, "Improvement of compact terminal antenna performance by incorporating open-end slots in ground plane," *IEEE Microwave and Wireless Components Letters*, vol. 14, 283-285, 2004.
I. Ang, Y. X. Guo, and Y. W. Chia, "Compact internal quad-band antenna for mobile phones" *Micro. Opt. Technol. Lett.*, vol. 38, No. 3 pp. 217-223 Aug. 2003.
International Preliminary Report on Patentability for International Application No. PCT/FI2004/000554, dated May 1, 2006.
Jing, X., et al.; "Compact Planar Monopole Antenna for Multi-Band Mobile Phones"; Microwave Conference Proceedings, Dec. 4-7, 2005.APMC 2005, Asia-Pacific Conference Proceedings, vol. 4.
Kim, B. C., J. H. Yun, and H. D. Choi, "Small wideband PIFA for mobile phones at 1800 MHz," *IEEE International Conference on Vehicular Technology*, 27{29, Daejeon, South Korea, May 2004.
Kim, Kihong et al., "Integrated Dipole Antennas on Silicon Substrates for Intra-Chip Communication", IEEE, pp. 1582-1585, 1999.
Kivekas., O., J. Ollikainen, T. Lehtiniemi, and P. Vainikainen, "Bandwidth, SAR, and eciency of internal mobile phone antennas," *IEEE Transactions on Electromagnetic Compatibility*, vol. 46, 71{86, 2004.
K-L Wong, *Planar Antennas for Wireless Communications*, Hoboken, NJ: Willey, 2003, ch. 2.
Lindberg., P. and E. Ojefors, "A bandwidth enhancement technique for mobile handset antennas using wavetraps," *IEEE Transactions on Antennas and Propagation*, vol. 54, 2226{2232, 2006.
Marta Martinez-Vazquez, et al., "Integrated Planar Multiband Antennas for Personal Communication Handsets", *IEEE Trasactions on Antennas and propagation*, vol. 54, No. 2, Feb. 2006.
P. Ciais, et al., "Compact Internal Multiband Antennas for Mobile and WLAN Standards", *Electronic Letters*, vol. 40, No. 15, pp. 920-921, Jul. 2004.
P. Ciais, R. Staraj, G. Kossiavas, and C. Luxey, "Design of an internal quadband antenna for mobile phones", *IEEE Microwave Wireless Comp. Lett.*, vol. 14, No. 4, pp. 148-150, Apr. 2004.
P. Salonen, et al. "New slot configurations for dual-band planar inverted-F antenna," *Microwave Opt. Technol.*, vol. 28, pp. 293-298, 2001.
Papapolymerou, Ioannis et al., "Micromachined Patch Antennas", IEEE Transactions on Antennas and Propagation, vol. 46, No. 2, pp. 275-283, Feb. 1998.

Product of the Month, RFDesign, "GSM/GPRS Quad Band Power AMP Includes Antenna Switch," 1 page, reprinted Nov. 2004 issue of RF Design (www.rfdesign.com), Copyright 2004, Freescale Semiconductor, RFD-24-EK.
S. Tarvas, et al. "An internal dual-band mobile phone antenna," in *2000 IEEE Antennas Propagat. Soc. Int. Symp. Dig.*, pp. 266-269, Salt Lake City, UT, USA.
Wang, F., Z. Du, Q. Wang, and K. Gong, "Enhanced-bandwidth PIFA with T-shaped ground plane," *Electronics Letters*, vol. 40, 1504-1505, 2004.
Wang, H.; "Dual-Resonance Monopole Antenna with Tuning Stubs"; IEEE Proceedings, Microwaves, Antennas & Propagation, vol. 153, No. 4, Aug. 2006; pp. 395-399.
Wong, K., et al.; "A Low-Profile Planar Monopole Antenna for Multiband Operation of Mobile Handsets"; IEEE Transactions on Antennas and Propagation, Jan. 2003, vol. 51, No. 1.
X.-D. Cai and J.-Y. Li, Analysis of asymmetric TEM cell and its optimum design of electric field distribution, IEE Proc 136 (1989), 191-194.
X.-Q. Yang and K.-M. Huang, Study on the key problems of interaction between microwave and chemical reaction, Chin Jof Radio Sci 21 (2006), 802-809.
Chiu, C.-W., et al., "A Meandered Loop Antenna for LTE/WWAN Operations in a Smartphone," Progress In Electromagnetics Research C, vol. 16, pp. 147-160, 2010.
Lin, Sheng-Yu; Liu, Hsien-Wen; Weng, Chung-Hsun; and Yang, Chang-Fa, "A miniature Coupled loop Antenna to be Embedded in a Mobile Phone for Penta-band Applications," Progress in Electromagnetics Research Symposium Proceedings, Xi'an, China, Mar. 22-26, 2010, pp. 721-724.
Zhang, Y.Q., et al. "Band-Notched UWB Crossed Semi-Ring Monopole Antenna," Progress in Electronics Research C, vol. 19, 107-118, 2011, pp. 107-118.
Joshi, Ravi K., et al., "Broadband Concentric Rings Fractal Slot Antenna", XXVIIIth General Assembly of International Union of Radio Science (URSI). (Oct. 23-29, 2005), 4 Pgs.
Singh, Rajender, "Broadband Planar Monopole Antennas," M.Tech credit seminar report, Electronic Systems group, EE Dept, IIT Bombay, Nov. 2003, pp. 1-24.
Gobien, Andrew, T. "Investigation of Low Profile Antenna Designs for Use in Hand-Held Radios," Ch.3, *The Inverted-L Antenna and Variations;* Aug. 1997, pp. 42-76.
See, C.H., et al., "Design of Planar Metal-Plate Monopole Antenna for Third Generation Mobile Handsets," Telecommunications Research Centre, Bradford University, 2005, pp. 27-30.
Chen, Jin-Sen, et al., "CPW-fed Ring Slot Antenna with Small Ground Plane," Department of Electronic Engineering, Cheng Shiu University.
"LTE—an introduction," Ericsson White Paper, Jun. 2009, pp. 1-16.
"Spectrum Analysis for Future LTE Deployments," Motorola White Paper, 2007, pp. 1-8.
Chi, Yun-Wen, et al. "Quarter-Wavelength Printed Loop Antenna With an Internal Printed Matching Circuit for GSM/DCS/PCS/UMTS Operation in the Mobile Phone," IEEE Transactions on Antennas and Propagation, vol. 57, No. 9m Sep. 2009, pp. 2541-2547.
Wong, Kin-Lu, et al. "Planar Antennas for WLAN Applications," Dept. of Electrical Engineering, National Sun Yat-Sen University, Sep. 2002 Ansoft Workshop, pp. 1-45.
"$\lambda/4$ printed monopole antenna for 2.45GHz," Nordic Semiconductor, White Paper, 2005, pp. 1-6.
White, Carson, R., "Single- and Dual-Polarized Slot and Patch Antennas with Wide Tuning Ranges," The University of Michigan, 2008.
Extended European Search Report dated Jan. 30, 2013, issued by the EPO for EP Patent Application No. 12177740.3.

* cited by examiner

SENSOR-BASED CLOSED LOOP ANTENNA SWAPPING APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNOLOGICAL FIELD

The present disclosure relates generally to antenna solutions for portable wireless devices, and particularly in one exemplary aspect to antenna solutions that make use of an integrated proximity sensor or other sensor.

2. DESCRIPTION OF RELATED TECHNOLOGY

Mobile devices with wireless communications capabilities such as mobile computers, mobile phones, smart phones, tablet computers, personal digital assistants (PDAs), "smart" watches, and other personal communication devices (PCDs) have become more ubiquitous in recent times. As a greater variety of devices have entered the mobile computing space, devices have become lighter in weight and smaller in size, while the functionality of these devices has increased greatly.

Specific Absorption Rate (SAR) is a measure of the rate at which electromagnetic energy is absorbed by the human body when exposed to, for example, a radio frequency (RF) electromagnetic field. Regulations (by e.g., the Federal Communications Commission (FCC)) exist to limit the SAR exposure users of mobile devices experience and thus limit the output power levels of such mobile devices. For example, the FCC limits RF exposure from cellular phones at a SAR level of 1.6 watts per kilogram (1.6 W/kg) taken over the volume containing a mass of 1 gram of tissue that absorbs the most signal. The European Union via the European Committee for Electrotechnical Standardization (CENELEC) limits RF exposure from mobile phones to 2 W/kg averaged over the 10 g of tissue absorbing the most signal. In mobile devices, to limit exposure to RF and to effectuate the regulations, proximity sensors are utilized to detect the presence of, for example, a human body in order to lower the power output for these mobile devices. However, the exclusive utilization of lower power output for these mobile devices can have resultant undesirable communications performance.

Accordingly, there is a need for apparatus, systems and methods that retain the overall performance of mobile device communications while effectuating compliance with, for example, SAR regulations for mobile devices. Ideally such a solution will select the antenna(s) having the best signal condition and connect these antenna(s) to the transmission/reception chain of, for example, a front end module commonly implemented on these mobile devices.

SUMMARY

The aforementioned needs are satisfied herein by providing, inter alia, a sensor-based closed loop antenna swapping system, and methods of making and operating the same.

In a first aspect, a portable wireless device is disclosed. In one embodiment, the portable wireless device includes a sensor coupled to a plurality of antenna modules as well as to a switching apparatus; a front end module in signal communication with the switching apparatus; and a controller configured to selectively couple individual ones of the plurality of antenna modules to the front end module via the switching apparatus.

In a variant, the sensor comprises a proximity sensor having a passive capacitive sensing apparatus.

In another variant, the (e.g., proximity) sensor is configured to obtain a plurality of measurement values from the plurality of antenna modules, as well as to provide these obtained measurement values to the controller.

In yet another variant, the controller is configured to selectively couple individual ones of the plurality of antenna modules to the front end module via the switching apparatus based at least in part on these obtained measurement values.

In yet another variant, the controller is configured to select one or more best available antenna modules of the plurality of antenna modules.

In yet another variant, the controller includes one or more pre-stored efficiency values for individual ones of the plurality of antenna modules.

In yet another variant, a type of the switching apparatus is selected based at least in part on a total number of the antenna modules and a total number of transceivers available in the front end module.

In yet another variant, the front end module includes at least a main transceiver and a separate multiple-in multiple-out (MIMO) transceiver.

In yet another variant, the controller is configured to selectively couple individual ones of the plurality of antenna modules to the front end module via the switching apparatus based at least in part on the type of transceiver chosen.

In yet another variant, the front end module is further configured to transmit signaling to individual ones of the antenna modules in order to switch and/or tune respective ones of the antenna modules.

In yet another variant, the front end module is further configured to transmit signaling to the controller.

In yet another variant, the controller is configured to receive signaling from the front end module, the signaling from the front end module being utilized in order to switch and/or tune respective ones of the antenna modules.

In a second aspect, a method for antenna selection is disclosed. In one embodiment, the method includes obtaining one or more sensing measurements from a plurality of antenna modules; providing these obtained sensing measurements to a controller; selecting a first signaling path between a front end module and individual ones of the plurality of antenna modules based at least in part on these provided sensing measurements; and transmitting signaling information from the front end module to individual ones of the antenna modules based at least in part on the selected first signaling path.

In a first variant, the act of selecting the signaling path is based at least in part on determining one or more best available antenna modules of the plurality of antenna modules.

In another variant, the method further includes selecting a second signaling path between the front end module and individual ones of the plurality of antenna modules based at least in part on these provided sensing measurements.

In yet another variant, the method further includes transmitting signaling information from the front end module to individual ones of the antenna modules based at least in part on the selected second signaling path.

In yet another variant, the first signaling path selected is based at least in part on determining a first type of transceiver for the front end module.

In yet another variant, the second signaling path selected is based at least in part on determining a second type of transceiver for the front end module.

In yet another variant, the method further includes switching and/or tuning one or more of the antenna modules.

In yet another variant, the act of switching and/or tuning is determined at least in part by determining the type of signaling information transmitted.

In a third aspect, a sensor-based antenna swapping apparatus is disclosed.

In a fourth aspect, antenna apparatus useful with e.g., a portable wireless device is disclosed. In one implementation, the antenna apparatus includes a sensor coupled to a plurality of antenna modules, as well as to a switching apparatus; a front end module in signal communication with the switching apparatus; and a controller configured to selectively couple individual ones of the plurality of antenna modules to the front end module via the switching apparatus.

In another embodiment, the antenna apparatus includes: a plurality of antenna elements; sensor apparatus configured to generate an output based on one or more sensed parameters relating to at least one aspect of the operation of the antenna elements; switching apparatus configured to selectively couple one or more of the plurality of antenna elements to a radio frequency front end module of the wireless device; and controller apparatus in operative communication with the sensor apparatus and configured to utilize the output in selective control of the switching apparatus.

In a fifth aspect, a method of operating a portable wireless device is disclosed. In one embodiment, the method includes: operating the device so as to transmit and/or receive wireless signals, including grasping the device in a user's hand; obtaining one or more sensing measurements from a plurality of antenna modules during the operation; providing these obtained sensing measurements to a controller; selecting a first signaling path between a front end module and individual ones of the plurality of antenna modules based at least in part on these provided sensing measurements; transmitting signaling information from the front end module to individual ones of the antenna modules based at least in part on the selected first signaling path; and transmitting and/or receiving the wireless signals via at least the first signaling path.

In a sixth aspect, a method of manufacturing an antenna apparatus is disclosed. In one embodiment, the method includes selecting sensor, controller and switching components according to one or more desired antenna performance metrics, and utilizing the selected components substantially within the interior volume of a portable wireless device.

In a seventh aspect, a method of configuring an antenna apparatus for use in a portable wireless device is disclosed.

BRIEF DESCRIPTION OF THE DRAWINGS

The features, objectives, and advantages of the disclosure will become more apparent from the detailed description set forth below when taken in conjunction with the drawings, wherein.

All Figures disclosed herein are © Copyright 2015 Pulse Finland Oy. All rights reserved.

DETAILED DESCRIPTION

Reference is now made to the drawings wherein like numerals refer to like parts throughout.

As used herein, the terms "antenna", and "antenna assembly" refer without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from one location to another location, using, one or more repeater links, and one or more locations may be mobile, stationary, or fixed to a location on earth such as a base station.

As used herein, the terms "top", "bottom", "side", "up", "down", "left", "right", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, Zigbee, Near field communication (NFC)/RFID, CDPD, satellite systems such as GPS and GLONASS, and millimeter wave or microwave systems.

Overview

The present disclosure addresses the foregoing needs by providing, inter alia, antenna systems within a portable wireless device that make use of an integrated proximity sensor or other sensor in order to implement a closed loop antenna selection system. In one embodiment, an exemplary portable wireless device includes as its primary components for implementing the closed loop antenna selection system: a proximity sensor/microcontroller unit (MCU); a switching apparatus; a baseband front end module (FEM); and a number of antenna modules. The portable wireless device utilizes "intelligent" antenna selection logic in order to improve upon overall radio frequency performance via an increase in the probability of selecting an appropriate RF signal path having desirable signal conditions. The integrated proximity sensor/MCU detects the presence (influence) of a user's hand, or other loading by any other dielectric or metal component, through measurements that take place through the antenna modules and selects the appropriate RF path for transmission and/or reception by the mobile device.

For example, and in implementations in which a main transceiver and a separate MIMO transceiver are utilized, the MCU will select the best available antenna module(s) available, and will direct the switching apparatus to couple a given transceiver with one or more respective antenna module(s). In one exemplary embodiment, the MCU will pre-store efficiency values for the antenna modules in a lookup table or other such data structure. The MCU will then provide signaling to a switching apparatus based upon at least the proximity sensor measurement values and the pre-stored efficiency values.

Moreover, in some embodiments, the baseband/FEM makes adjustments to operating characteristics of the signaling depending upon which antenna modules have been selected by the proximity sensor/MCU. For example, the baseband FEM may make physical antenna-related adjustments (such as phase), and/or higher-layer adjustments (e.g., modulation coding scheme (MCS) adjustments) in order to obtain better utilization of its multi-antenna system. Moreover, the baseband/FEM may, in some embodiments, provide signaling, either directly or indirectly, to the antenna modules for the purposes of switching and/or tuning respective ones of the antenna modules to a desired frequency band.

Methods of using and testing the aforementioned antenna systems are also disclosed.

Exemplary Embodiments

Detailed descriptions of the various embodiments and variants of the apparatus and methods of the present disclosure are now provided. While primarily discussed in the context of portable wireless devices that incorporate several (e.g., four (4)) distinct antenna modules, the various apparatus and methodologies discussed herein are not so limited. In fact, many of the apparatus and methodologies described herein are useful in any number of portable wireless devices that incorporate any number of antenna modules (so long as at least two distinct antenna modules are resident within/on the portable wireless device) including, without limitation, five (5) or more distinct antenna modules.

Moreover, while primarily described in the exemplary context of an apparatus with a common proximity sensor/microcontroller unit, it is readily understood that the various principles of the present disclosure can be readily extended and applied to implementations having other types of sensors and/or configurations, including without limitation those with a discrete proximity sensor chipset(s) along with discrete controller and/or microcontroller unit(s), other types of proximity sensors (e.g., those which do not operate on a capacitance principle), or even non-proximity sensors (e.g., those which sense orientation/attitude, acceleration, conductivity, optical characteristics, etc.).

Furthermore, while described primarily in the exemplary context of a portable wireless device that communicates in accordance with a so-called multiple-in/multiple-out (MIMO) context, the various apparatus and methodologies discussed herein are not so limited. Those of ordinary skill will readily understand that the teachings of the present disclosure can be applied to virtually any wireless system or wireless communication protocol(s) including, without limitation, usage scenarios involving so-called carrier aggregation (CA) in which any band combination (e.g., low band (LB) and high band (HB); HB-HB; etc.) are utilized, as well as SIMO and MISO applications.

Exemplary Antenna Solution with Integrated Proximity Sensor

Figure 1:
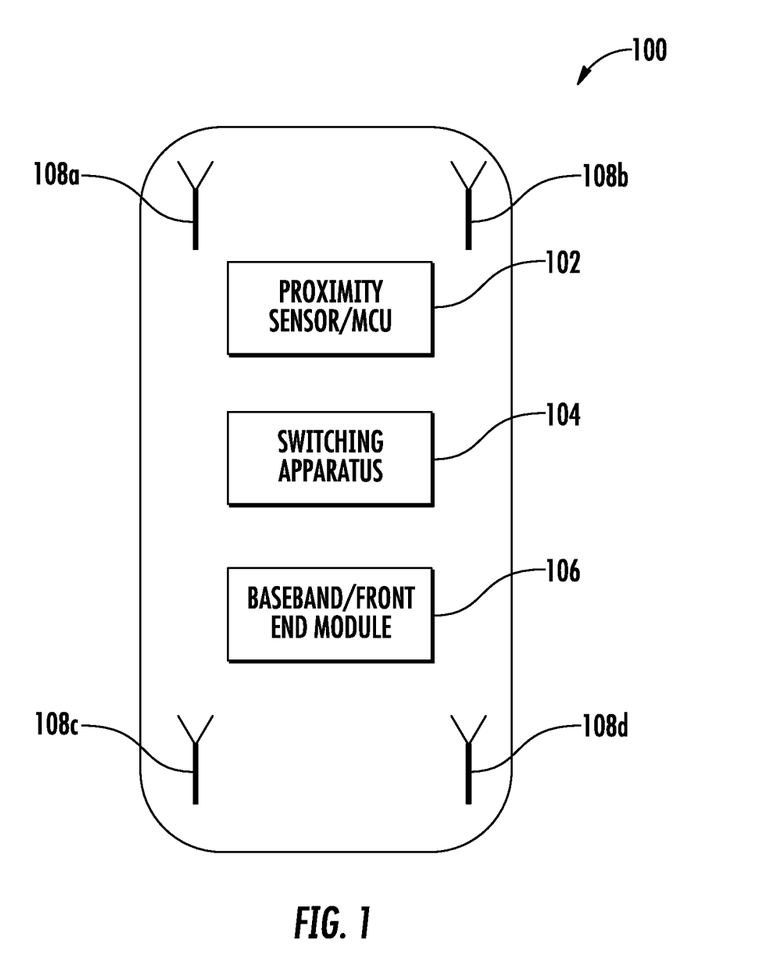
FIG. 1 is a generalized block diagram of a portable wireless device that utilizes a sensor (e.g., proximity sensor) in order to enable closed loop antenna selection in accordance with the principles of the present disclosure.

Referring now to FIG. 1, an exemplary portable wireless device 100 that utilizes a proximity sensor/microcontroller unit (MCU) 102 in order to enable closed loop antenna selection is shown and described in detail. The portable wireless device illustrated in FIG. 1 is shown in FIG. 1 at a high level of abstraction, and utilizes "intelligent" antenna selection logic in order to improve upon overall radio frequency performance via an increase in the probability of selecting an appropriate RF signal path having desirable signal conditions. For example, the integrated proximity sensor/MCU detects the presence (influence) of a user's hand, or other loading by any other dielectric or metal component, and selects the appropriate RF path for transmission and/or reception by the mobile device. In other words, the portable wireless device utilizes the proximity sensor/MCU in order to select the appropriate antenna(s), and connect these antenna(s) to the transmission/reception chain of the baseband/front end module (FEM) 106.

It will be appreciated that the best/appropriate chain for a transmission event may also not always be the same as the best/appropriate chain for reception; hence, the present disclosure contemplates the possibility of use of one chain or configuration for transmission, and another for reception in certain cases.

In one embodiment, the portable wireless device 100 constitutes a smart phone; however, it is readily appreciated that in alternative implementations, the portable wireless device could include, without limitation, any number of well-known devices such as mobile computers (e.g., laptops), mobile phones, tablet computers, personal digital assistants (PDAs), "smart" watches, and other personal communication devices (PCDs).

The portable wireless device includes as its primary components for implementing its closed loop antenna selection system: a proximity sensor/MCU 102; a switching apparatus 104; a baseband front end module (FEM) 106; and a number of antenna modules 108a, 108b, 108c, 108d.

In one exemplary embodiment, the proximity sensor/MCU 102 includes a capacitive sensing apparatus. The capacitive sensing apparatus utilizes, i.e., body capacitance as an input, but generally can detect other objects or changes in environment that are in proximity to a capacitive sensing detection apparatus. One exemplary benefit for the capacitive sensing apparatus is that it is not dependent upon RF power for object detection (i.e., it is considered a passive electrical component) and hence advantageously is a comparatively low power solution for object detection (as compared to e.g., active sensors which require greater electrical power and hence which can reduce battery life). In an exemplary embodiment, the proximity sensor/MCU 102 utilizes measurements (values) obtained from proximity sensor compatible antenna modules 108a, 108b, 108c, 108d. Typically, the proximity sensor obtains these measurements every few milliseconds, although it is appreciated that the periodicity for these measurements can be varied depending upon the specific requirements for the application, as well as a function of operational conditions (e.g., when powered off, the frequency may be reduced, or in highly dynamic environments, the frequency may be increased). The proximity sensor detection apparatus provides its change in capacitance measurements (for example, when a user's hand comes in close proximity to one or more of the antenna modules) over to the MCU for use by the latter.

The MCU utilizes these measurement values in order to choose the best available antenna module(s) for transmission and/or reception of wireless signals. For example, and in implementations in which a main transceiver and a separate MIMO transceiver are utilized, the MCU will select the best available antenna modules available, and will direct the switching apparatus to couple a given transceiver with one or more respective antenna module(s). In one exemplary embodiment, the MCU will pre-store efficiency values for the antenna modules in a lookup table or other such data structure. The MCU will then provide signaling to the switching apparatus based upon at least the proximity sensor measurement values and the pre-stored efficiency values. For example, in an embodiment in which two antenna modules (of an available four) are not covered by a user's hand, the MCU will select the antenna module with the higher efficiency for the main transceiver, and the other available antenna module will be selected for the MIMO transceiver. In other words, the baseband will combine the signals from the two branches. If the signal condition is good on both branches, then the portable wireless device 100 will stay in MIMO mode. Alternatively, if the signal condition is not good enough for demodulation of two separate paths then the portable wireless device will switch to a diversity mode. For example, in 2×2 MIMO, two separate data streams are received and demodulated thus giving better data throughput. In diversity mode operation, two copies of the same signal are combined thereby enabling longer range/better cell edge performance.

It will also be recognized that while pre-stored/predetermined efficiency values are described in the exemplary implementation, other types of values may be used consistent with the present disclosure. For example, in one alternate implementation, the efficiency values are dynamically determined as opposed to being previously stored (such as by, e.g., calculation according to an algorithm running on the MCU or another digital processor in the host device, or gate logic such as on an FPGA). In another implementation, other metrics of antenna performance are used. In yet another implementation, two or more metrics (whether predetermined and/or dynamic) are used. Myriad other possibilities will be recognized by those of ordinary skill given the present disclosure.

The switching apparatus 104 is in signal communication with the MCU as well as the baseband/FEM 106 and each of the antenna modules. Accordingly, and in instances where the baseband/FEM includes: a main transceiver; and a separate MIMO transceiver along with four (4) available antenna modules, the switching apparatus will advantageously be a two-pole four-throw (2P4T) switch. In other words, the switching apparatus will be switched in order to couple each of these transceivers (i.e., main and MIMO) to a respective antenna module. The selection of these respective antenna modules will be governed by signaling from the MCU. In alternative implementations such as, for example, higher rank of multiple-in/multiple-out (MIMO) applications, a 4P6T switch may be chosen in order to connect each of four available transceivers to four different antenna modules (where six antenna modules are otherwise available for selection). Other switching implementations are also envisioned and are chosen depending upon: the number of transceivers available for the portable wireless device and the number of available antenna modules.

Moreover, in some embodiments, the baseband/FEM makes adjustments to operating characteristics of the signaling depending upon which antenna modules have been selected by the proximity sensor/MCU. For example, the baseband FEM may make physical antenna-related adjustments (such as phase), and/or higher-layer adjustments (e.g., modulation coding scheme (MCS) adjustments) in order to obtain better utilization of its multi-antenna system. In other words, if antenna module 108a and antenna module 108d have been selected, a given phase adjustment may be made to the signaling provided to and/or received from antenna module 108a and/or antenna module 108d. Moreover, if antenna module 108b and antenna module 108d have been selected, a given phase adjustment (albeit differing from the phase adjustment associated with the selection of antenna module 108a and antenna module 108d) may be made to the signaling provided to and/or received from antenna module 108b and antenna module 108d. Similar phase adjustments may be made to other ones of the antenna module(s) depending upon factors such as antenna module placement, spacing, etc.

Exemplary closed loop antenna switching apparatus implementation examples consistent with the principles of the present disclosure are now described in detail.

Example #1

Figure 2:
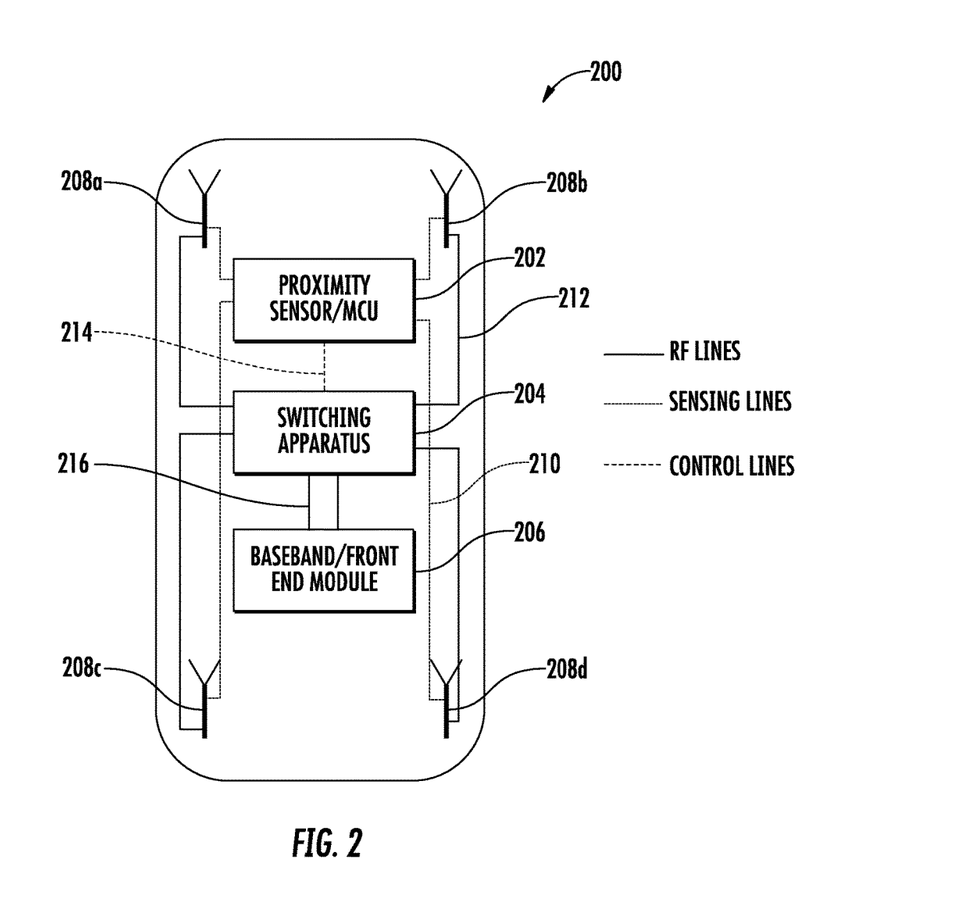
FIG. 2 is a generalized block diagram of a first exemplary portable wireless device that utilizes a proximity sensor in order to enable closed loop antenna selection for non-switchable/tunable antennas in accordance with the principles of the present disclosure.

Referring now to FIG. 2, a first exemplary mobile device 200 implementation is shown and described in detail. Similar to the embodiment described with regards to FIG. 1, the main components involved in the closed loop antenna switching system include: a proximity sensor/MCU 202; a switching apparatus 204; a baseband FEM 206; and a plurality of antenna modules 208a, 208b, 208c, 208d. The specific implementation details for each of these components can be readily selected from the options described above with regards to FIG. 1, and would readily be understood by one of ordinary skill given the present disclosure. The baseband/FEM 206 in this illustrated embodiment includes a two branch FEM. In other words, two radio frequency (RF) lines 216 couple the baseband/FEM with the switching apparatus 204. Although an exemplary two branch FEM is shown, it is readily appreciated that the number of branches may vary depending upon the particular configuration chosen for the mobile device. The switching apparatus is further coupled to respective ones of the antenna modules 208a, 208b, 208c, 208d via respective RF lines 212 that couple the switching apparatus to respective ones of the antenna modules. In the illustrated embodiment, the switching apparatus constitutes an exemplary 2P4T switch.

The proximity sensor/MCU 202 is coupled with respective ones of the antenna modules via proximity sensing lines 210. The proximity sensor/MCU obtains periodic measurements (e.g., every few milliseconds) from one or more of the antenna modules via sensing lines 210. Alternatively, separate sensing pads (not shown) are located adjacent the antenna modules and periodic measurement are obtained via sensing lines 210. In one exemplary embodiment, the proximity sensing lines are manufactured from coaxial lines each of which includes an inner conductor surrounded by both an insulating layer as well as a conductive shield outer layer. The use of coaxial lines is exemplary in that noise doesn't couple to the signal transmitted along sensing lines. Alternatively, in embodiments which include separate sensing chips disposed adjacent each of the antenna modules, the lines coupled to the MCU don't necessarily need to include coaxial lines as digital signaling can be transmitted from each of these sensing chips to a centrally located MCU.

Additionally, a feedback line 214 is located between the proximity sensor/MCU and the switching apparatus which is utilized by the proximity sensor/MCU to inform the switching apparatus which of the antenna module(s) should be selected for transmission/reception. In one embodiment, this feedback line 214 includes one or more general-purpose input/output (GPIO) lines for the transmission of signaling from the proximity sensor/MCU to the switching apparatus. Alternatively, this feedback line includes one or more mobile industry processor interface (MIPI) compliant lines for the transmission of signaling from the proximity sensor/MCU to the switching apparatus.

Accordingly, in one implementation, a user's hand is detected by proximity sensor/MCU via sensing lines 210 and proximity sensor pads located adjacent antenna modules 208a and 208b. The proximity sensor/MCU will, in an exemplary embodiment, utilize a lookup table indicating that switching apparatus should couple RF lines 216 to respective ones of antenna module 208c and antenna module 208d as each of these antenna modules has been collectively determined to have the best efficiency available for mobile device 200. The switching apparatus will then couple the baseband/FEM 206 to antenna module 208c and antenna module 208d. Moreover, in one exemplary embodiment, proximity sensor/MCU will determine that antenna module 208c has a higher efficiency value associated with it then the efficiency value associated with antenna module 208d. Accordingly, in MIMO implementations, antenna module 208c will be selected as the main antenna for the baseband/FEM while antenna module 208d will be selected as the MIMO antenna for the baseband/FEM. Alternatively, it is also envisioned that the antenna implementation selected (e.g., main and MIMO) may effectively be reversed, such that the MIMO antenna is selected for antenna module 208c, while the main antenna is selected for antenna module 208d. The specific choices made may be predetermined by, for example, the mobile device manufacturer. These illustrated embodiments are merely illustrative of the broader concepts described herein (i.e., they are illustrative of the broader closed loop antenna switching methodologies described herein).

Example #2

Figure 3:
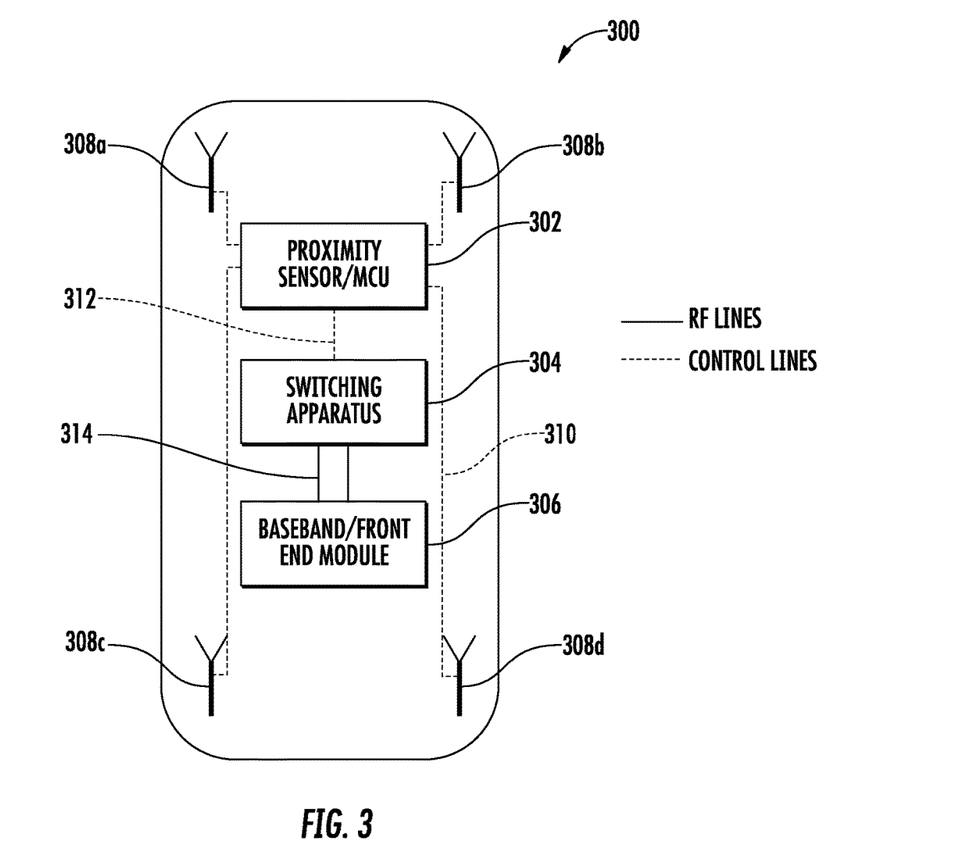
FIG. 3 is a generalized block diagram of a second exemplary portable wireless device that utilizes a proximity sensor in order to enable closed loop antenna selection for switchable/tunable antennas in accordance with the principles of the present disclosure.

Referring now to FIG. 3, a second exemplary mobile device 300 implementation is shown and described in detail. Similar to the embodiment described above with regards to FIGS. 1 and 2, the main components involved in the closed loop antenna switching system include: a proximity sensor/MCU 302; a switching apparatus 304; a baseband/FEM 306; and a plurality of antenna modules 308a, 308b, 308c, 308d. The underlying methodology for the closed loop antenna switching apparatus is generally as described with regards to FIG. 2 above and hence, the operation of much of the methodology for the mobile device is not reiterated here. However, unlike the embodiment described above with regards to FIG. 2, one or more of the antenna modules 308a, 308b, 308c, 308d are switchable and/or tunable antenna modules such as those described with regards to U.S. patent application Ser. No. 11/008,447 filed Dec. 9, 2004 and entitled "Adjustable multi-band antenna", now U.S. Pat. No. 7,468,700; U.S. patent application Ser. No. 11/544,173 filed Oct. 5, 2006 and entitled "Multi-band antenna with a common resonant feed structure and methods", now U.S. Pat. No. 7,589,678; U.S. patent application Ser. No. 12/080,741 filed Apr. 3, 2008 and entitled "Multiband antenna system and methods", now U.S. Pat. No. 7,889,143; U.S. patent application Ser. No. 11/801,894 filed May 11, 2007 and entitled "Antenna component and methods", now U.S. Pat. No. 7,916,086; U.S. patent application Ser. No. 12/596,141 filed May 17, 2010 and entitled "Methods and apparatus for matching an antenna", now U.S. Pat. No. 8,466,756; U.S. patent application Ser. No. 12/082,882 filed Apr. 14, 2008 and entitled "Adjustable antenna and methods", now U.S. Pat. No. 8,473,017; U.S. patent application Ser. No. 11/989,451 filed Jul. 27, 2009 and entitled "Adjustable multiband antenna and methods", now U.S. Pat. No. 8,564,485; U.S. patent application Ser. No. 13/086,319 filed Apr. 13, 2011 and entitled "Wideband antenna and methods", now U.S. Pat. No. 8,618,990; U.S. patent application Ser. No. 12/083,129 filed May 17, 2010 and entitled "Multiband antenna system and methods", now U.S. Pat. No. 8,786,499; and U.S. patent application Ser. No. 13/439,576 filed Apr. 4, 2012 and entitled "Compact polarized antenna and methods", now U.S. Pat. No. 8,988,296, the contents of each of the foregoing being incorporated herein by reference in their entirety.

In the illustrated embodiment, the baseband/FEM 306 is coupled to each of the antenna modules 308a, 308b, 308c, 308d via control lines 310. In one embodiment, control lines 310 include one or more general-purpose input/output (GPIO) lines for the transmission of signaling from the baseband/FEM to respective ones of the antenna modules for the purposes of switching and/or tuning respective ones of the antenna modules to a desired frequency band. Alternatively, these control lines include one or more mobile industry processor interface (MIPI) compliant lines for the transmission of signaling from the baseband/FEM to respective ones of the antenna modules.

The operation of the switching/tuning of the antenna modules operates, in one exemplary embodiment, as follows. A user's hand is detected by proximity sensor/MCU via sensing lines and proximity sensors located adjacent antenna modules 308c and 308d. Proximity sensor/MCU will, in an exemplary embodiment, utilize a lookup table to determine which of the available antenna modules are best suited for transmission/reception and signal the switching apparatus accordingly via feedback line 312. In one embodiment, feedback line 312 includes one or more general-purpose input/output (GPIO) lines for the transmission of signaling from the proximity sensor/MCU to the switching apparatus. Alternatively, this feedback line includes one or more mobile industry processor interface (MIPI) compliant lines for the transmission of signaling from the proximity sensor/MCU to the switching apparatus.

The signaling from the proximity sensor/MCU indicates to the switching apparatus that RF lines 314 should be coupled to antenna modules 308a and 308b, as each of these antenna modules have been determined to have the best efficiency values available for mobile device 300. The switching apparatus will then couple the baseband/FEM 306 to antenna modules 308a and 308b. Moreover, in one exemplary embodiment, proximity sensor/MCU will determine that antenna module 308a has a higher efficiency value associated with it then antenna module 308b. Accordingly, in MIMO implementations, antenna module 308a will be selected as the main antenna for the baseband/FEM while antenna module 308b will be selected as the MIMO antenna for the baseband/FEM. Simultaneously, or prior to, the coupling of the RF lines 314 to antenna modules 308a and 308b; baseband/FEM 306 will provide signaling via control lines 310 to antenna modules 308a and 308b, respectively, in order to switch and/or tune these antenna modules 308a and 308b to the appropriate frequency band selected by proximity sensor/MCU 302. Accordingly, antenna modules 308a and 308b are switched/tuned appropriately so that antenna module 308a transmits and/or receives signals in accordance with main antenna operation while antenna module 308b transmits and/or receives signals in accordance with MIMO antenna operation.

Figure 3A:
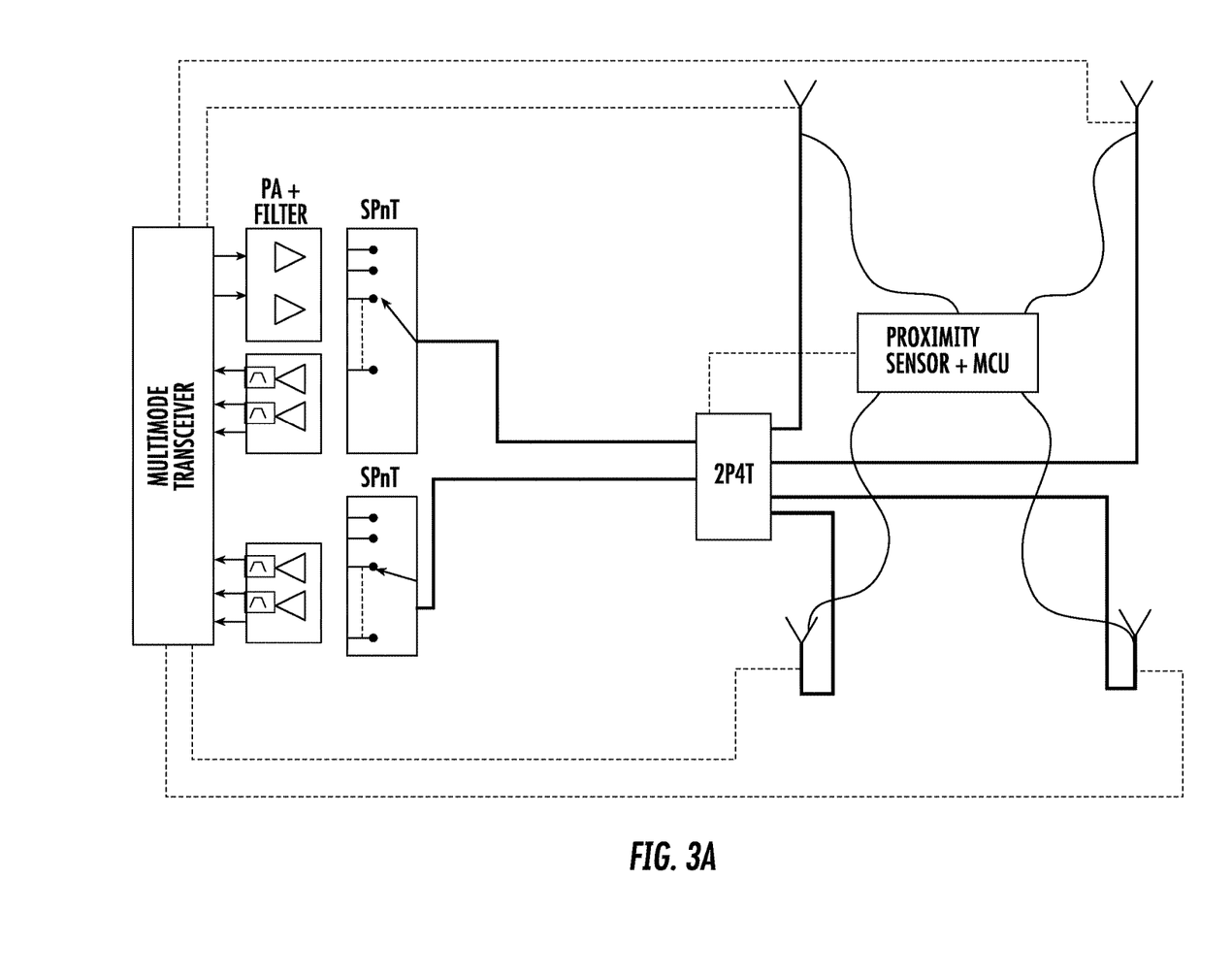
FIG. 3A shows one exemplary implementation of the functionality shown in FIG. 3, in the context of an exemplary cellular telephone apparatus having 2.5G, 3G and 4G communications capability in accordance with the principles of the present disclosure.

FIG. 3A illustrates one exemplary implementation for the generalized block diagram shown in FIG. 3 in the context of a cellular telephone having 2.5G, 3G, and 4G communications capability.

Example #3

Figure 4:
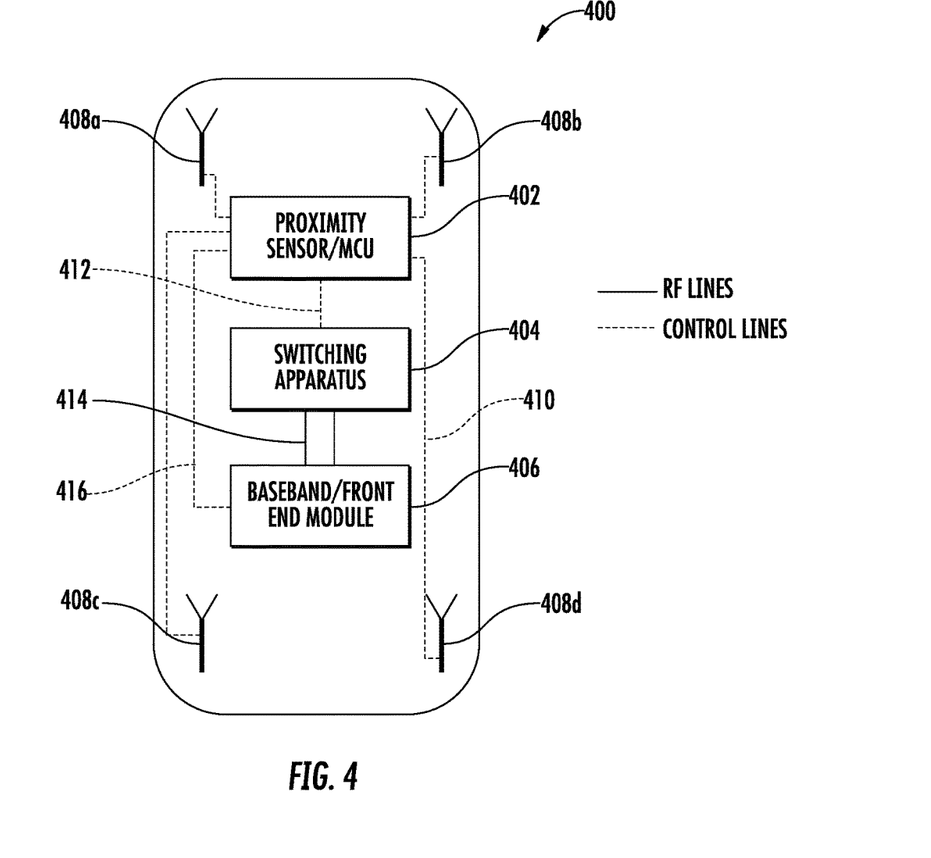
FIG. 4 is a generalized block diagram of a third exemplary portable wireless device that utilizes a proximity sensor in order to enable closed loop antenna selection for switchable/tunable antennas in accordance with the principles of the present disclosure.

Referring now to FIG. 4, a third exemplary mobile device 400 implementation is shown and described in detail. Similar to the embodiments described above with regards to FIGS. 1-3, the main components involved in the closed loop antenna switching system include: a proximity sensor/MCU 402; a switching apparatus 404; a baseband FEM 406; and a plurality of antenna modules 408a, 408b, 408c, 408d. The underlying methodology for the closed loop antenna switching apparatus is generally as described with regards to FIG. 2 and hence, the operation of much of the methodology for the mobile device is not reiterated here. However, unlike the embodiment described with regards to FIG. 2 (and similar to the embodiment of FIG. 3), one or more of the antenna modules 408a, 408b, 408c, 408d are switchable and/or tunable antenna modules such as those described with regards to U.S. patent application Ser. No. 11/008,447 filed Dec. 9, 2004 and entitled "Adjustable multi-band antenna", now U.S. Pat. No. 7,468,700; U.S. patent application Ser. No. 11/544,173 filed Oct. 5, 2006 and entitled "Multi-band antenna with a common resonant feed structure and methods", now U.S. Pat. No. 7,589,678; U.S. patent application Ser. No. 12/080,741 filed Apr. 3, 2008 and entitled "Multi-band antenna system and methods", now U.S. Pat. No. 7,889,143; U.S. patent application Ser. No. 11/801,894 filed May 11, 2007 and entitled "Antenna component and methods", now U.S. Pat. No. 7,916,086; U.S. patent application Ser. No. 12/596,141 filed May 17, 2010 and entitled "Methods and apparatus for matching an antenna", now U.S. Pat. No. 8,466,756; U.S. patent application Ser. No. 12/082,882 filed Apr. 14, 2008 and entitled "Adjustable antenna and methods", now U.S. Pat. No. 8,473,017; U.S. patent application Ser. No. 11/989,451 filed Jul. 27, 2009 and entitled "Adjustable multiband antenna and methods", now U.S. Pat. No. 8,564,485; U.S. patent application Ser. No. 13/086,319 filed Apr. 13, 2011 and entitled "Wideband antenna and methods", now U.S. Pat. No. 8,618,990; U.S. patent application Ser. No. 12/083,129 filed May 17, 2010 and entitled "Multiband antenna system and methods", now U.S. Pat. No. 8,786,499; and U.S. patent application Ser. No. 13/439,576 filed Apr. 4, 2012 and entitled "Compact polarized antenna and methods", now U.S. Pat. No. 8,988,296, the contents of each of the foregoing being previously incorporated herein by reference in their entirety.

In the illustrated embodiment, the baseband/FEM 406 is coupled to proximity sensor/MCU 402 via control line 416. In one embodiment, control line 416 includes one or more general-purpose input/output (GPIO) lines for the transmission of signaling from the baseband/FEM to the proximity sensor/MCU for the purposes of switching and/or tuning respective ones of the antenna modules to a desired frequency band. Alternatively, this control line includes one or more mobile industry processor interface (MIPI) compliant lines for the transmission of signaling from the baseband/FEM to respective ones of the antenna modules.

The operation of the switching/tuning of the antenna modules operates, in one exemplary embodiment, as follows. A user's hand is detected by proximity sensor/MCU via sensing lines and proximity sensors located adjacent antenna modules 408a and 408b. Proximity sensor/MCU will, in an exemplary embodiment, utilize a lookup table to determine which of the available antenna modules are best suited for transmission/reception and signal the switching apparatus accordingly via feedback line 412. In one embodiment, feedback line 412 includes one or more general-purpose input/output (GPIO) lines for the transmission of signaling from the proximity sensor/MCU to the switching apparatus. Alternatively, this feedback line includes one or more mobile industry processor interface (MIPI) compliant lines for the transmission of signaling from the proximity sensor/MCU to the switching apparatus.

The signaling from the proximity sensor/MCU indicates to the switching apparatus that RF lines 414 should be coupled to antenna modules 408c and 408d as each of these antenna modules have been determined to have the best efficiency available for mobile device 400. The switching apparatus will then couple the baseband/FEM 406 to antenna modules 408c and 408d. Moreover, in one exemplary embodiment, proximity sensor/MCU will determine that antenna module 408c has a higher efficiency value associated with it then antenna module 408d. Accordingly, in MIMO implementations, antenna module 408c will be selected as the main antenna for the baseband/FEM while antenna module 408d will be selected as the MIMO antenna for the baseband/FEM. Simultaneously, or prior to, the coupling of the RF lines 414 to antenna modules 408c and 408d; baseband/FEM 406 will provide signaling to proximity sensor/MCU 402 in order for proximity sensor/MCU to switch and/or tune these antenna modules 408c and 408d to the appropriate frequency band via control lines 410. Accordingly, antenna modules 408a and 408b are switched/tuned appropriately so that antenna module 408c transmits and/or receives signals in accordance with main antenna operation while antenna module 408d transmits and/or receives signals in accordance with MIMO antenna operation.

Figure 4A:
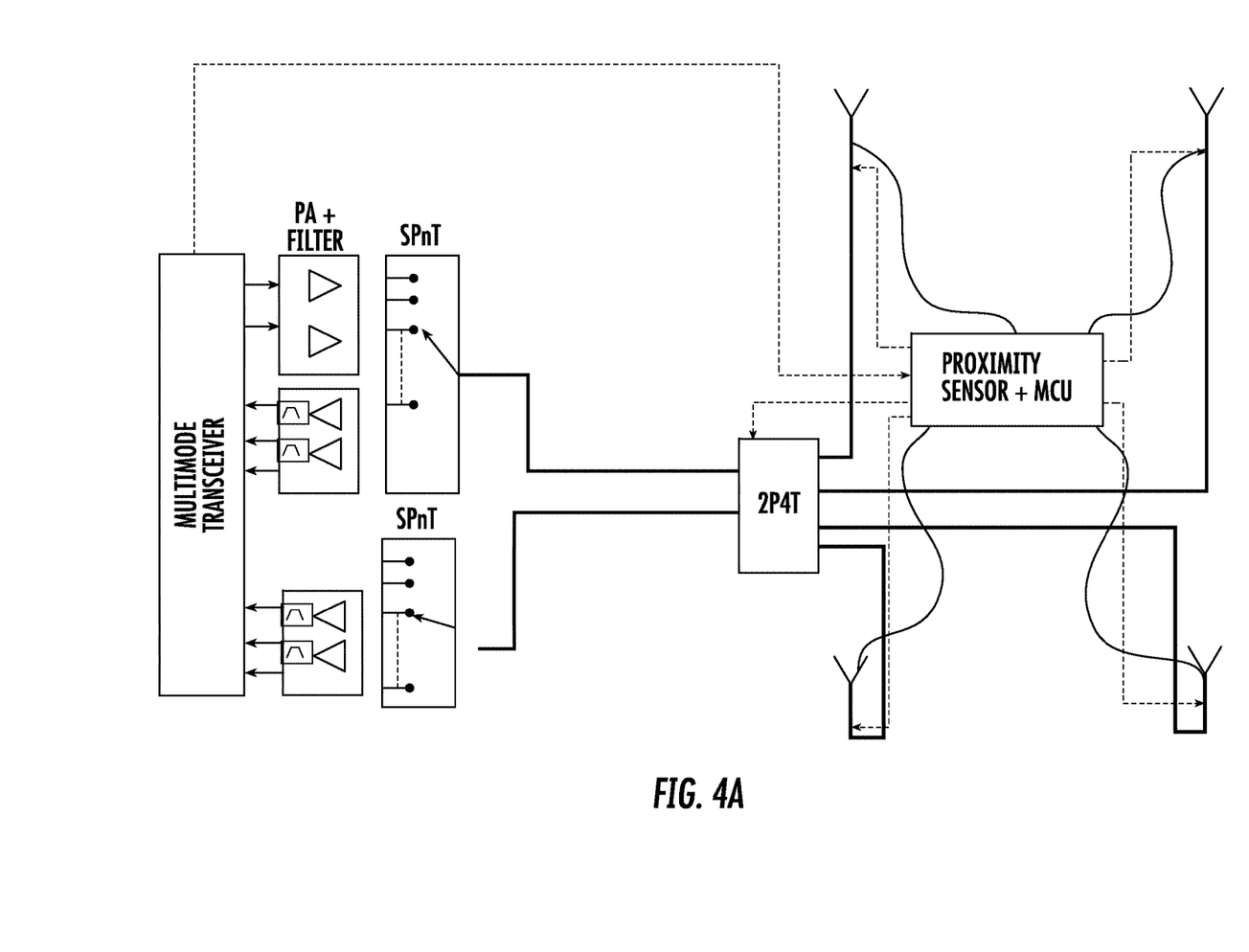
FIG. 4A shows one exemplary implementation of the functionality shown in FIG. 4, in the context of an exemplary cellular telephone apparatus having 2.5G, 3G and 4G communications capability in accordance with the principles of the present disclosure.

FIG. 4A illustrates one exemplary implementation for the generalized block diagram shown in FIG. 4 in the context of a cellular telephone having 2.5G, 3G, and 4G communications capability.

It will be appreciated that while the foregoing exemplary embodiments and examples utilize a single sensing (e.g., capacitance-based passive proximity sensor) and processing (MCU) unit, various of these functions may be divided across two or more similar devices (e.g., left/right and top/bottom proximity sensors, two or more MCUs), and/or performed by other indigenous sensors and/or processing apparatus within the host device. For instance, rather than include a separate MCU for the functions described herein, an extant MCU or digital processor on the host device (e.g., DSP or CPU) can be configured to perform these calculations/operations, such as via software/firmware running thereon and implementing the foregoing logic.

It will be recognized that while certain aspects of the present disclosure are described in terms of specific design examples, these descriptions are only illustrative of the broader methods of the disclosure, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. Antenna apparatus for use in a wireless device, the apparatus comprising:
   a plurality of antenna elements;
   sensor apparatus coupled to each of the plurality of antenna elements, the sensor apparatus being configured to periodically sense one or more parameters from each of the plurality of antenna elements at a periodic time interval, the periodic time interval being based on an operational condition of the antenna apparatus, the sensor apparatus being further configured to generate an output based on the one or more periodically sensed parameters relating to at least one aspect of the operation of the plurality of antenna elements;
   switching apparatus configured to selectively couple two or more of the plurality of antenna elements to a radio frequency front end module of the wireless device, the selective coupling of the two or more of the plurality of antenna elements comprising an exclusion from use of ones of the plurality of antenna elements associated with change in the one or more periodically sensed one or more parameters; and
   controller apparatus in operative communication with the sensor apparatus and configured to utilize the output in selective control of the switching apparatus;
   wherein the controller apparatus utilizes both the output from the sensor apparatus as well as a plurality of pre-stored efficiency values associated with one or more of the plurality of antenna elements for the selective control of the switching apparatus.

2. The antenna apparatus of claim 1, wherein the controller apparatus is further configured to select a first antenna element based at least in part on the plurality of pre-stored efficiency values for a main transceiver, the first antenna element having a higher efficiency than other ones of the selectively coupled antenna elements.

3. The antenna apparatus of claim 2, wherein the controller apparatus is further configured to select a second antenna element based at least in part on the plurality of pre-stored efficiency values for an auxiliary transceiver, the second antenna element having a lower efficiency than the first antenna element.

4. The antenna apparatus of claim 1, wherein one of the plurality of antenna elements is configured to receive a signal from the radio frequency front end module of the wireless device, the signal configured to switch the one antenna element from a first operational frequency band to a second distinct operational frequency band.

5. The antenna apparatus of claim 1, wherein the controller apparatus utilizes one or more dynamically determined efficiency values associated with each of the plurality of antenna elements.

6. The antenna apparatus of claim 5, wherein the controller apparatus is further configured to utilize the one or more dynamically determined efficiency values for the selective control of the switching apparatus.

7. The antenna apparatus of claim 1, wherein a type of the switching apparatus is selected based at least in part on a total number of the plurality of antenna elements and a total number of transceivers available in the radio frequency front end module.

8. The antenna apparatus of claim 1, wherein the front end module includes at least a main transceiver and a separate multiple-in multiple-out (MIMO) transceiver.

9. The antenna apparatus of claim 8, wherein the controller apparatus is configured to selectively couple individual ones of the plurality of antenna modules to the radio frequency front end module via the switching apparatus based at least in part on a type of transceiver chosen.

10. The antenna apparatus of claim 1, wherein the radio frequency front end module is configured to transmit signaling to individual ones of the plurality of antenna elements in order to switch and/or tune respective ones of the plurality of antenna elements.

11. The antenna apparatus of claim 10, wherein the radio frequency front end module is further configured to transmit signaling to the controller apparatus.

12. The antenna apparatus of claim 11, wherein the controller apparatus is further configured to receive signaling from the radio frequency front end module, the signaling from the radio frequency front end module being utilized in order to switch and/or tune the respective ones of the plurality of antenna elements.

13. A method for intelligent antenna selection, comprising:
   obtaining one or more sensing measurements from a plurality of antenna modules;
   providing the obtained one or more sensing measurements to a controller;
   selecting a first signaling path between a front end module and first ones of the plurality of antenna modules based at least in part on the provided one or more sensing measurements;
   selecting a second signaling path between the front end module and second ones of the plurality of antenna modules based at least in part on the provided one or more sensing measurements;
   simultaneously transmitting signaling information from the front end module to the first and second ones of the antenna modules based at least in part on the selected first and second signaling paths; and
   based on a first efficiency value associated with the first ones of the plurality of antenna modules being greater than a second efficiency value associated with the second ones of the plurality of antenna modules:

combining the signaling information corresponding to the first and second signaling paths; and operating the first ones of the plurality of antenna modules as main antennas simultaneously with operating the second ones of the plurality of antenna modules as multiple-in, multiple-out (MIMO) antennas.

14. The method of claim 13, wherein the operating of the first ones of the plurality of antenna modules is based at least in part on determining one or more best available antenna modules of the plurality of antenna modules.

15. The method of claim 13, wherein the first signaling path selected is based at least in part on determining a first type of transceiver for the front end module.

16. The method of claim 15, wherein the second signaling path selected is based at least in part on determining a second type of transceiver for the front end module.

17. The method of claim 13, further comprising performing at least one of (i) switching and/or (ii) tuning of one or more of the antenna modules; wherein the act of switching and/or tuning is determined at least in part by determining the type of signaling information transmitted.

18. The method of claim 13, wherein the obtaining of the one or more sensing measurements from the plurality of antenna modules comprises periodically obtaining the one or more sensing measurements through sensing lines connecting a proximity sensor and sensing pads disposed adjacent to respective ones of the plurality of antenna modules.

19. The method of claim 13, wherein the first efficiency value comprises a predetermined efficiency value, and the method further includes storing the predetermined efficiency value in a data structure associated with the controller.

20. The method of claim 13, wherein the second efficiency value comprises a predetermined efficiency value, and the method further includes storing the predetermined efficiency value in a data structure associated with the controller.

* * * * *